(12) United States Patent
Papangelis et al.

(10) Patent No.: US 12,293,758 B1
(45) Date of Patent: May 6, 2025

(54) OPINION-BASED NATURAL LANGUAGE RESPONSE GENERATION

(71) Applicant: Amazon Technologies, Inc., Seattle, WA (US)

(72) Inventors: Alexandros Papangelis, Pleasant Hill, CA (US); Behnam Hedayatnia, San Francisco, CA (US); Chao Zhao, Raleigh, NC (US); Devamanyu Hazarika, Sunnyvale, CA (US); Di Jin, Santa Clara, CA (US); Dilek Hakkani-Tur, Los Altos, CA (US); Mahdi Namazifar, Oakland, CA (US); Seokhwan Kim, San Jose, CA (US); Spandana Gella, Montreal (CA); Yang Liu, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 337 days.

(21) Appl. No.: 18/081,929

(22) Filed: Dec. 15, 2022

Related U.S. Application Data

(60) Provisional application No. 63/429,757, filed on Dec. 2, 2022.

(51) Int. Cl.
*G10L 15/22* (2006.01)
*G10L 15/18* (2013.01)

(52) U.S. Cl.
CPC .......... *G10L 15/1815* (2013.01); *G10L 15/22* (2013.01); *G10L 2015/223* (2013.01)

(58) Field of Classification Search
CPC ................ G10L 15/1815; G10L 15/22; G10L 2015/223
USPC ................................ 704/231, 239, 246, 251
See application file for complete search history.

(56) References Cited

U.S. PATENT DOCUMENTS

2014/0019443 A1 * 1/2014 Golshan .............. G06F 16/9535
707/723

OTHER PUBLICATIONS

Stefanos Angelidis, et al. 2021. Extractive Opinion Summarization in Quantized Transformer Spaces. In Transactions of the Association for Computational Linguistics, vol. 9, pp. 277-293, Retrieved from https://aclanthology.org/2021.tacl-1.17.pdf.

(Continued)

*Primary Examiner* — George C Monikang
(74) *Attorney, Agent, or Firm* — Pierce Atwood LLP

(57) ABSTRACT

Techniques for generating opinion-based content responsive to a user input are described. The system may receive a user input, and determine dialog context data corresponding to a dialog between a user and the system, and including the user input. The system may determine generation of content responsive to the user input requires opinion-based knowledge, and may extract entities from the dialog context data, and determine natural language data of a knowledge base that includes entities similar to the extracted entities. The system may processes the natural language data and the dialog context data to determine a subset of the natural language data that is responsive to the user input. The system may generate output data responsive to the user input using the responsive natural language data and the dialog context.

20 Claims, 9 Drawing Sheets

(56) References Cited

OTHER PUBLICATIONS

Satanjeev Banerjee, et al. 2005. METEOR: An Automatic Metric for MT Evaluation with Improved Correlation with Human Judgments. In Proceedings of the Workshop on Intrinsic and Extrinsic Evaluation Measures for Machine Translation and/or Summarization, pp. 65-72, Retrieved from https://aclanthology.org/W05-0909.
Johannes Bjerva, et al. 2020. SUBJQA: A Dataset for Subjectivity and Review Comprehension. In Proceedings of the 2020 Conference on Empirical Methods in Natural Language Processing, (Online), pp. 5480-5494, Retrieved from https://aclanthology.org/2020.emnlp-main.442.
Arthur Brazinskas, et al. 2020. Unsupervised Opinion Summarization as Copycat-Review Generation, 19 pages, Retrieved from https://arxiv.org/abs/1911.02247v2.
Pawel Budzianowski, et al. 2018. MultiWOZ—A Large-Scale Multi-Domain Wizard-of-Oz Dataset for Task-Oriented Dialogue Modelling. In Proceedings of the 2018 Conference on Empirical Methods in Natural Language Processing, pp. 5016-5026, Retrieved from https://aclanthology.org/D18-1547.
Zhiyu Chen, et al. 2022. KETOD: Knowledge-Enriched Task-Oriented Dialogue. In Findings of the Association for Computational Linguistics: NAACL 2022, pp. 2581-2593, Retrieved from https://aclanthology.org/2022.findings-naacl.197.
Eric Chu, et al. 2019. MeanSum: A Neural Model for Unsupervised Multi-document Abstractive Summarization, 22 pages, Retrieved from https://arxiv.org/abs/1810.05739v4.
Jacob Devlin, et al. 2019. BERT: Pre-training of Deep Bidirectional Transformers for Language Understanding. In Proceedings of North American Association for Computational Linguistics-Human Language Technologies, pp. 4171-4186, Retrieved from https://aclanthology.org/N19-1423.pdf.
Eleftherios Dimitrakis, et al. 2018. On Finding the Relevant User Reviews for Advancing Conversational Faceted Search. In Proceedings of 4th Workshop on Sentic Computing, Sentiment Analysis, Opinion Mining, and Emotion Detection (EMSASW 2018) Co-located with the 15th Extended Semantic Web Conference 2018 (ESWC 2018), pp. 23-31, Retrieved from https://users.ics.forth.gr/~marketak/files/dimitrakis2018finding.
Emily Dinan, et al. 2018. Wizard of Wikipedia: Knowledge-Powered Conversational Agents, pp. 1-18, Retrieved from https://arxiv.org/abs/1811.01241v2.
Mihail Eric, et al. 2020. MultiWOZ 2.1: A Consolidated Multi-Domain Dialogue Dataset with State Corrections and State Tracking Baselines. In Proceedings of the 12th Conference on Language Resources and Evaluation, pp. 422-428. European Language Resources Association (ELRA), Retrieved from https://aclanthology.org/2020.lrec-1.53.
Mihail Eric, et al. 2017. Key-Value Retrieval Networks for Task-Oriented Dialogue. In Proceedings of the SIGDIAL 2017 Conference, pp. 37-49, Retrieved from https://aclanthology.org/W17-5506.pdf.
Angela Fan, et al. 2018. Hierarchical Neural Story Generation. In Proceedings of the 56th Annual Meeting of the Association for Computational Linguistics (Long Papers), pp. 889-898, Retrieved from https://aclanthology.org/P18-1082.
Song Feng, et al. 2021. MultiDoc2Dial: Modeling Dialogues Grounded in Multiple Documents, 18 pages, Retrieved from https://arxiv.org/abs/2109.12595v1.
Song Feng, et al. 2020. doc2dial: A Goal-Oriented Document-Grounded Dialogue Dataset. In Proceedings of the 2020 Conference on Empirical Methods in Natural Language Processing, pp. 8118-8128, Retrieved from https://aclanthology.org/2020.emnlp-main.652.
Marjan Ghazvininejad, et al. 2018. A Knowledge-Grounded Neural Conversation Model. In the Thirty-Second AAAI Conference on Artificial Intelligence (AAAI-18), vol. 32, No. 1, 8 pages, Retrieved from https://ojs.aaai.org/index.php/AAAI/article/view/11977.

Karthik Gopalakrishnan, et al. 2019. Topical-Chat: Towards Knowledge-Grounded Open-Domain Conversations. In INTERSPEECH 2019, pp. 1891-1895.
Priya Goyal, et al. 2018. Accurate, Large Minibatch SGD: Training ImageNet in 1 Hour, 12 pages, Retrieved from https://arxiv.org/abs/1706.02677v2.
Pencheng He, et al. 2021. DEBERTA: Decoding-Enhanced BERT with Disentangled Attention. In International Conference on Learning Representations (ICLR), 23 pages, Retrieved from https://arxiv.org/abs/2006.03654v6.
Qingnan Jiang, et al. 2019. A Challenge Dataset and Effective Models for Aspect-Based Sentiment Analysis. In Proceedings of the 2019 Conference on Empirical Methods in Natural Language Processing and the 9th International Joint Conference on Natural Language Processing (EMNLP-IJCNLP), pp. 6280-6285, Retrieved from https://aclanthology.org/D19-1654.
Di Jin, et al. 2021. Can I Be of Further Assistance? Using Unstructured Knowledge Access to Improve Task-oriented Conversational Modeling. In Proceedings of the 1st Workshop on Document-grounded Dialogue and Conversational Question Answering (DialDoc 2021), Online, pp. 119-127, Retrieved from https://aclanthology.org/2021.dialdoc-1.16.pdf.
Seokhwan Kim, et al. 2020. Beyond Domain APIs: Task-oriented Conversational Modeling with Unstructured Knowledge Access. In Proceedings of the 21th Annual Meeting of the Special Interest Group on Discourse and Dialogue, pp. 278-289, 1st virtual meeting, Retrieved from https://aclanthology.org/2020.sigdial-1.35.pdf.
Seokhwan Kim, et al. 2021. "How Robust R U?": Evaluating Task-Oriented Dialogue Systems on Spoken Conversations. In 2021 IEEE Automatic Speech Recognition and Understanding Workshop (ASRU), 8 pages, Retrieved at https://arxiv.org/abs/2109.13489.
Mojtaba Komeili, et al. 2022. Internet-Augmented Dialogue Generation. In Proceedings of the 60th Annual Meeting of the Association for Computational Linguistics, vol. 1: Long Papers, pp. 8460-8478, Retrieved from https://aclanthology.org/2022.acl-long.579.pdf.
Zhenzhong Lan, et al. 2020. Albert: A Lite BERT for Self-supervised Learning of Language Representations. In International Conference on Learning Representations (ICLR), 17 pages, Retrieved from https://arxiv.org/abs.1909.11942v6.
Esther Levin, et al. 2000. A stochastic model of human-machine interaction for learning dialog strategies, IEEE Transactions on Speech and Audio Processing, vol. 8, Issue 1, pp. 11-23, Retrieved from https://www.researchgate.net/publication/3333675_A_Stochastic_Model_of_Human-Machine_Interaction_for_Learning_Dialog_Strategies.
Mike Lewis, et al. 2020. BART: Denoising Sequence-to-Sequence Pre-training for Natural Language Generation, Translation, and Comprehension. In Proceedings of the 58th Annual Meeting of the Association for Computational Linguistics, pp. 7871-7880, Retrieved from https://aclanthology.org/2020.acl-main.703.pdf.
Chin-Yew Lin, et al. 2004. ROUGE: A Package for Automatic Evaluation of Summaries. In Text Summarization Branches Out, pp. 74-81, Retrieved from https://aclanthology.org/W04-1013.
Shuman Liu, et al. 2018. Knowledge Diffusion for Neural Dialogue Generation. In Proceedings of the 56th Annual Meeting of the Association for Computational Linguistics (vol. 1: Long Papers), pp. 1489-1498, Retrieved from https://aclanthology.org/P18-1138.
Yinhan Liu, et al. 2019. RoBERTa: A Robustly Optimized BERT Pretraining Approach, 13 pages, Retrieved from https://arxiv.org/abs/1907.11692v1.
Yinong Long, et al. 2017. A Knowledge Enhanced Generative Conversational Service Agent. In Proceedings of Dialog System Technology Challenges (DSTC6) Workshop, 6 pages, Retrieved from https://www.researchgate.net/publication/325215058_A_Knowledge_Enhanced_Generative_Conversational_Service_Agent.
Ilya Loshchilov, et al. 2019. Decoupled Weight Decay Regularization. In International Conference on Learning Representations (ICLR), 19 pages, Retrieved from https://arxiv.org/abs/1711.05101v3.
Bodhisattwa Prasad Majumder, et al. 2022. Achieving Conversational Goals with Unsupervised Post-hoc Knowledge Injection. In Proceedings of the 60th Annual Meeting of the Association for

(56) References Cited

OTHER PUBLICATIONS

Computational Linguistics (vol. 1: Long Papers), 3140-3153, Retrieved from https://aclanthology.org/2022.acl-long.224.

Bodhisattwa Prasad Majumder, et al. 2020. Interview: Large-scale Modeling of Media Dialog with Discourse Patterns and Knowledge Grounding. In Proceedings of the 2020 Conference on Empirical Methods in Natural Language Processing (EMNLP), (Online), pp. 8129-8141, Retrieved from https://aclanthology.org/2020.emnlp-main.653.

Pierre-Emmanuel Mazare, et al. 2018. Training Millions of Personalized Dialogue Agents. In Proceedings of the 2018 Conference on Empirical Methods in Natural Language Processing, pp. 2775-2779, Retrieved from https://aclanthology.org/D18-1298.

Julian McAuley, et al. 2016. Addressing Complex and subjective product-related queries with customer reviews. In Proceedings of the 25th International Conference on Empirical Methods in Natural Language Processing, pp. 2775-2779, Retrieved from https://cseweb.ucsd.edu/~jmcauley/pdfs/www16b.pdf.

Nikita Moghe, et al. 2018. Towards Exploiting Background Knowledge for Building Conversation Systems. In Proceedings of the 2018 Conference on Empirical Methods in Natural Language Processing, pp. 2322-2332, Retrieved from https://aclanthology.org/D18-1255.

Seungwhan Moon, et al. 2019. OpenDialKG: Explainable Conversational Reasoning with Attention-based Walks over Knowledge Graphs. In Proceedings of the 57th Annual Meeting of the Association for Computational Linguistics, pp. 845-854, Retrieved from https://aclanthology.org/P19-1081.

Jianmo Ni, et al. 2019. Justifying Recommendations using Distantly-Labeled Reviews and Fine-Grained Aspects. In Proceedings of the 2019 Conference on Empirical Methods in Natural Language Processing and the 9th International Joint Conference on Natural Language Processing, pp. 188-197, Retrieved from https://aclanthology.org/D19-1018.

Kishore Papineni, et al. 2002. BLEU: a Method for Automatic Evaluation of Machine Translation. In Proceedings of the 40th Annual Meeting of the Association for Computational Linguistics, pp. 311-318, Retrieved from https://aclanthology.org/P02-1040.pdf.

Gustavo Penha, et al. 2019. Introducing MANtIS: a novel Multi-Domain Information Seeking Dialogues Dataset, 15 pages, Retrieved from https://arxiv.org/abs/1912.04639v1.

Maria Pontiki, et al. 2016. SemEval-2016 Task 5: Aspect Based Sentiment Analysis. In Proceedings of the 10th International Workshop on Semantic Evaluation, pp. 19-30, Retrieved from https://aclanthology.org/S16-1002.

Maria Pontiki, et al. 2015. SemEval-2015 Task 12: Aspect Based Sentiment Analysis. In Proceedings of the 9th International Workshop on Semantic Evaluation, pp. 486-495, Retrieved from https://aclanthology.org/S15-2082.

Alec Radford, et al. 2019. Language Models are Unsupervised Multitaks Learners, 24 pages, Retrieved from https://d4mucfpksywv.cloudfront.net/better-language-models/language-models.pdf.

Colin Raffel, et al. 2020. Exploring the Limits of Transfer Learning with a Unified Text-to-Text Transformer. Journal of Machine Learning Research, vol. 21, 67 pages, Retreived from https://jmlr.org/papers/volume21/20-074/20-074.

Abhinav Rastogi, et al. 2020. Towards Scalable Multi-Domain Conversational Agents: The Schema-Guided Dialogue Dataset. In Proceedings of the AAAI Conference on Artificial Intelligence, vol. 34, pp. 8689-8696, Retrieved from https://ojs.aaai.org/index.php/AAAI/article/view/6394/6250.

Nils Reimers, et al. 2019. Sentence-BERT: Sentence Embeddings Using Siamese BERTnetworks. In Proceedings of the 2019 Conference on Empirical Methods in Natural Language Processing and the 9th International Joint Conference on Natural Language Processing, pp. 3982-3992, Retrieved from https://aclanthology.org/D19-1410.

Stephen Robertson, et al. 2009. The Probabilistic Relevance Framework. In Foundations and Trends in Information Retrieval, vol. 3, Issue 4, pp. 333-389, Retreived from https://www.staff.city.ac.uk/~sbrp622/papers/foundations_bm25_review.pdf.

Marzieh Saeidi, et al. 2018. Interpretation of Natural Language Rules in Conversational Machine Reading. In Proceedings of the 2018 Conference on Empirical Methods in Natural Language Processing, pp. 2087-2097, Retrieved from https://aclanthology.org/D18-1233.

Satinder Singh, et al. 2002. Optimizing Dialogue Management with Reinforcement Learning: Experiments with the NJFun System. In Journal of Artificial Intelligence Research, vol. 16, pp. 105-133.

Yi-Lin Tuan, et al. 2019. DyKgChat: Benchmarking Dialogue Generation Grounding on Dynamic Knowledge Graphs. In Proceedings of the 2019 Conference on Empirical Methods in Natural Language Processing and the 9th International Joint Conference on Natural Language Processing (EMNLP-IJCNLP), pp. 1855-1865, Retrieved from https://aclanthology.org/D19-1194.

Pavlos Vougiouklis, et al. 2016. A Neural Network Approach for Knowledge-Driven Response Generation. In Proceedings of COLING 2016, the 26th International Conference on Computational Linguistics: Technical Papers, pp. 3370-3380. Retrieved from https://aclanthology.org/C16-1318.

Jason D Williams, et al. 2007. Partially Observable Markov Decision Processes for Spoken Dialog Systems, 138 pages, Retrieved from https://citeseerx.ist.psu.edu/document?repid=rep1&type=pdf&doi=bb0829c9a0c71c39d96afaecd070b1e1c047e53c.

Thomas Wolf, et al. 2020. Transformers: State-of-the-Art Natural Language Processing. In Proceedings of the 2020 Conference on Empirical Methods in Natural Language Processing: System Demonstrations, pp. 38-45, Online, Retrieved from https://aclanthology.org/2020.emnlp-demos.6.

Thomas Wolf, et al. 2019 TransferTransfo: A Transfer Learning Approach for Neural Network Based Conversational Agents, 6 pages, Retrieved from https://arxiv.org/abs/1901.08149v2.

Chien-Sheng Wu, et al. 2019. Global-To-Local Memory Pointer Networks For Task-Oriented Dialogue. In International Conference on Learning Representations, 19 pages, Retrieved from https://openreview.net/forum?id=ryxnHhRqFm.

Jun Xu, et al. 2021. Enhancing Dialog Coherence with Event Graph Grounded Content Planning. In Proceedings of the Twenty-Ninth International Joint Conference on Artificial Intelligence (IJCAI-20), pp. 3941-3947.

Houyu Zhang, et al. 2020. Grounded Conversation Generation as Guided Traverses in Commonsense Knowledge Graphs. In Proceedings of the 58th Annual Meeting of the Association for Computational Linguistics, pp. 2031-2043, Retrieved from https://aclanthology.org/2020.acl-main.184.

Tianyi Zhang, et al. 2020. Bertscore: Evaluating Text Generation With Bert. In International Conference on Learning Representations, pp. 1-43.

Wenxuan Zhang, et al. 2021. Aspect Sentiment Quad Prediction as Paraphrase Generation. In Proceedings of the 2021 Conference on Empirical Methods in Natural Language Processing, pp. 9209-9219, Retrieved from https://aclanthology.org/2021.emnlp-main.726.

Yizhe Zhang, et al. 2020. DIALOGPT : Large-Scale Generative Pre-Training for Conversational Response Generation. In Proceedings of the 58th Annual Meeting of the Association for Computational Linguistics, pp. 270-278.

Kangyan Zhou, et al. 2018. A Dataset for Document Grounded Conversations. In Proceedings of the 2018 Conference on Empirical Methods in Natural Language Processing, pp. 708-713, Retrieved from https://arxiv.org/abs/1809.07358v1.

Hyunmi Baek, et al. 2012. Helpfulness of Online Consumer Reviews: Readers' Objective and Review Cues. In International Journal of Electronic Commerce, vol. 17, No. 2, pp. 99-126.

Michel Galley, et al. 2019. Grounded Response Generation Task at DSTC7. In AAAI Dialog System Technology Challenges Workshop, 5 pages, Retrieved from http://workshop.colips.org/dstc7/papers/DSTC7_Task_2_overview_paper.

Michael A. Kamins, et al. 1989. Two-Sided Versus One-Sided Celebrity Endorsements: The Impact on Advertising Effectiveness and Credibility. In Journal of Advertising, vol. 18, No. 2, pp. 4-10, Retrieved from https://www.jstor.org/stable/4188716.

(56) References Cited

OTHER PUBLICATIONS

Jumin Lee, et al. 2008. The Effect of Negative Online Consumer Reviews on Product Attitude: An Information Processing View. In Electronic Commerce Research and Applications, vol. 7, No. 3, pp. 341-352, Retrieved from https://www.sciencedirect.com/science/article/abs/pii/S1567422307000415.

Bing Liu, et al. 2012. A Survey of Opinion Mining and Sentiment Analysis. In Mining Text Data, Chapter 13, pp. 415-463.

\* cited by examiner

OPINION-BASED NATURAL LANGUAGE RESPONSE GENERATION

CROSS-REFERENCE TO RELATED APPLICATION

This application claims benefit under 35 U.S.C. § 119 of U.S. provisional patent application No. 63/429,757, filed Dec. 2, 2022, and titled "SUBJECTIVE NATURAL LANGUAGE RESPONSE GENERATION," the contents of which are incorporated herein by reference in their entirety.

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
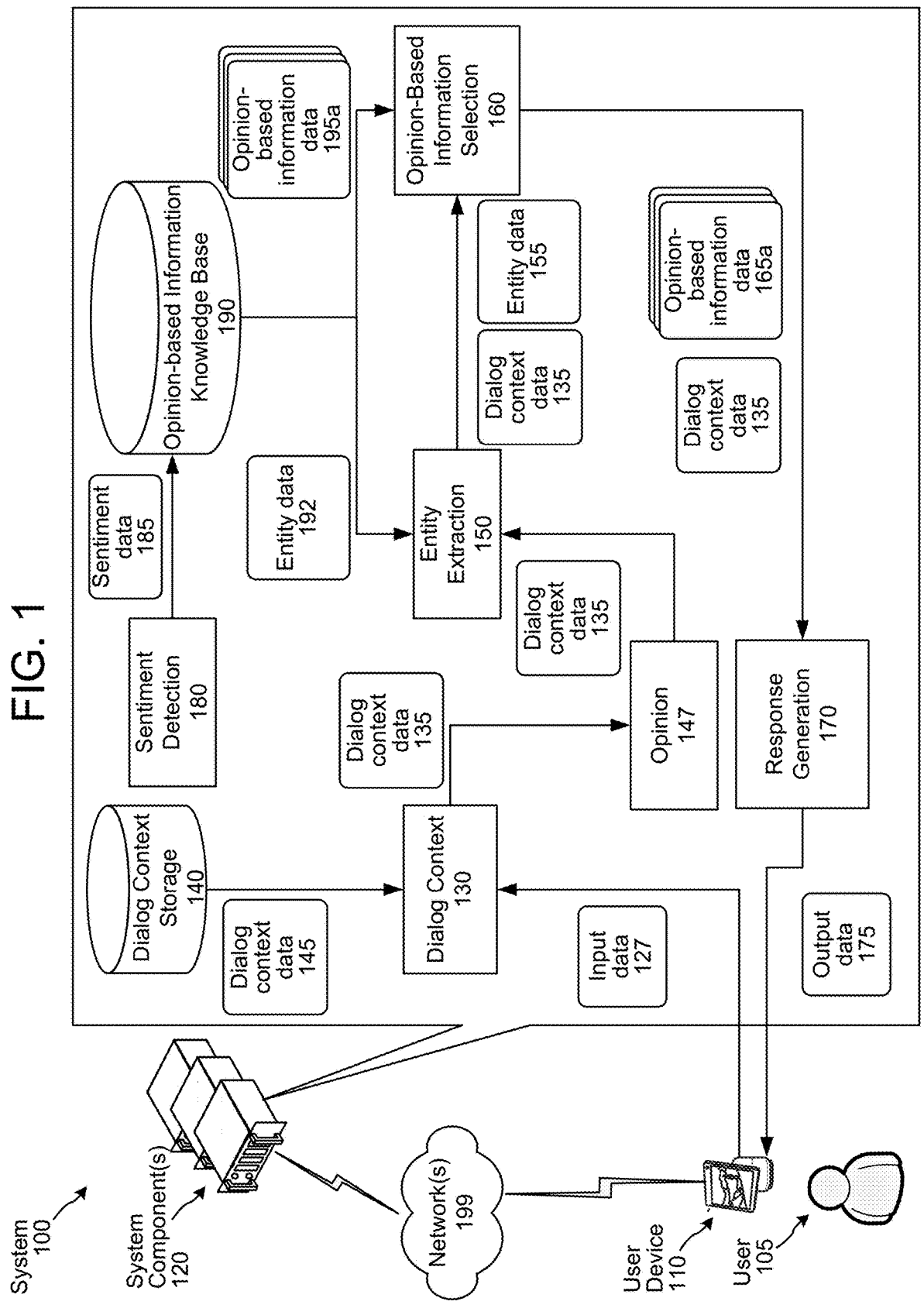
FIG. 1 is a conceptual diagram illustrating a system for determining when opinion-based information is to be used to generate a response to a user input, and well as for generating a response to the user input using opinion-based information, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content.

A system may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user.

The system may perform ASR processing on audio, of a spoken natural language user input, to determine a text or tokenized transcript of the spoken natural language user input. The system may perform NLU processing on the text or tokenized transcript (or a text or tokenized representation of a typed natural language user input) to determine an intent of the user input, and optionally one or more entities indicated in the user input. A skill component may process the intent, and optional one or more entities, to determine a response to the user input (e.g., determine weather information, determine one or more news stories, play a song, play a video, turn on a "smart" light, etc.).

In some instances, responding to a user input may require the use of opinion-based information provided by one or more users of the system. As used herein, "opinion-based information" (e.g., descriptions of experiences, observations on products/services, answers to questions, etc.) may include subjective information (e.g., information that is based on or influenced by personal feelings and/or tastes, or otherwise represent information based on an opinion), and optionally objective information (e.g., factual information). Examples of prompts that may solicit opinion-based information are: "how is the food at ABC restaurant," "what is the WiFi quality at café ABC," "how is the room service at ABC hotel," "is the staff friendly at ABC business," "do the products by ABC company hold their quality," or the like, as these user inputs request information that is not entirely factual.

The present disclosure provides techniques for determining when a user input requests an output to be generated using opinion-based information, as well as techniques for generating a response to the user input using opinion-based information.

The system may receive a user input, and determine a dialog context associated with one or more interactions between the user and the system. Using the dialog context and the present user input, the system may determine whether generation of an output, responsive to the user input, requires use of opinion-based information. For example, for a user input: "is ABC company known for quality products," the system may determine that generation of a response to the user input requires use of data from multiple people which may or may not be located in one place.

Based on determining generation of the output requires use of opinion-based information, the system may perform entity extraction processing, on dialog context including the user input, to determine one or more entities included in the dialog context. Thereafter, the system may determine one or more instances of opinion-based information, in a knowledge base, that includes entities that are at least one of semantically similar or identical to those extracted from the dialog context. In some embodiments, an instance of opinion-based information may be stored as natural language in the knowledge base.

The system may process the one or more instances of opinion-based information to determine a subset thereof that is responsive to the user input. For example, if the user input is "is ABC company known for quality products," the system may determine that the opinion "I have bought several products from ABC, I keep coming back for the quality" is responsive to the user input. In contrast, for example, if the user input is "is ABC company known for quality products," the system may determine that the opinion "I am a long time customer of ABC, they have such a friendly staff," while including the entity "ABC" corresponding to the entity "ABC" company in the user input, is not responsive to the user input.

The system may use the dialog context and the subset of the opinion-based information, determined to be responsive to the user input, to generate an output responsive to the user input. The system may present the output to the user as synthesized speech and/or displayed content.

In some embodiments, the subset of the opinion-based information, determined to be responsive to the user input, may include more than one opinion. In such embodiments, the system may determine the output, responsive to the user input, to be a concatenation or summary of the multiple opinions.

A system of the present disclosure may receive, from a user device, first input audio data corresponding to a first spoken input of a dialog. The system may perform automatic speech recognition (ASR) processing using the first input audio data to generate a ASR output including a transcript of the first spoken input. The system may determine dialog context including the ASR output and previous ASR output representing at least one previous spoken input of the dialog. The system may use a trained classifier to process the dialog context to determine that a response to the first spoken input requires use of a knowledge base. Based on determining that the response to the first spoken input requires use of the knowledge base, the system may determine a first entity, represented in the dialog context, corresponds to first natural language in the knowledge base, where the first natural language corresponds to a first user input with respect to the first entity, the first natural language is associated with a first sentiment, and second natural language in the knowledge base, where the second natural language corresponds to a second user input with respect to the first entity, the second natural language is associated with a second sentiment. The system may generate a first output responsive to the first spoken input, wherein the first output summarizes the first sentiment and the second sentiment.

In some embodiments, the system may further perform entity extraction processing on the dialog context to determine the first entity. The system may determine a second entity that is semantically similar to the first entity. The system may determine the first natural language is associated with the second entity in the knowledge base. The system may determine the second natural language is associated with the second entity in the knowledge base, where generating the first output is based on determining the first natural language and the second natural language are associated with the second entity in the knowledge base.

In some embodiments, the system may further use a trained machine learning (ML) model to determine first encoded data including the dialog context and the first natural language. The system may use a second trained classifier to process the first encoded data to determine that the first natural language is responsive to the first spoken input. The system may use the trained ML model to determine second encoded data including the dialog context and the second natural language. The system may use the second trained classifier to process the second encoded data to determine that the second natural language is responsive to the first spoken input, where generating the first output is based on determining the first natural language and the second natural language are responsive to the first spoken input.

In some embodiments, the first sentiment may be different from the second sentiment. The system may generate the first output to indicate user satisfactions of the first entity based on the first sentiment and the second sentiment.

A system of the present disclosure may receive a first input corresponding to a first natural language user input. The system may determine the first natural language user input is associated with a first entity. The system may identify, in a knowledge base, first natural language corresponding to first user data with respect to the first entity, where the first natural language is associated with a first sentiment. The system may identify, in the knowledge base, second natural language corresponding to second user data with respect to the first entity, where the second natural language is associated with a second sentiment. The system may use the first sentiment and the second sentiment to generate a first output responsive to the first natural language user input.

In some embodiments, the system may further perform entity extraction processing on the first input to determine the first entity. The system may determine a second entity that is semantically similar to the first entity. The system may determine the first natural language is associated with the second entity in the knowledge base. The system may determine the second natural language is associated with the second entity, where generating the first output is based on determining the first natural language and the second natural language are associated with the second entity in the knowledge base.

In some embodiments, the system may further determine first encoded data including the first input and the first natural language. The system may process the first encoded data to determine that the first natural language is responsive to the first natural language user input. The system may determine second encoded data including the first input and the second natural language. The system may process the second encoded data to determine that the second natural language is responsive to the first natural language user input, where generating the first output is based on determining the first natural language and the second natural language are responsive to the first natural language user input.

In some embodiments, the first sentiment may be different from the second sentiment. The system may generate the first output to indicate user satisfactions of the first entity based on the first sentiment and the second sentiment.

In some embodiments, the first input is associated with a dialog, and the system may further determine dialog context including the first natural language user input and at least a first previous natural language user input of the dialog. The system may process the dialog context to determine that a response to the first natural language user input requires use of the knowledge base.

In some embodiments, the system may further determine third natural language included in the knowledge base, the third natural language being associated with the first entity and the second sentiment, where the second sentiment is different from the first sentiment, the first output includes a first percentage representing that the first natural language is associated with the first sentiment, and the first output includes a second percentage representing that the second natural language and the third natural language are associated with the second sentiment.

In some embodiments, the system may receive a video including an audio portion. The system may perform automatic speech recognition (ASR) processing on the audio portion to generate third natural language corresponding to speech in the audio portion. The system may perform sentiment detection processing on the third natural language to determine a third sentiment of the speech in the audio portion. The system may further use the third sentiment to generate the first output.

Teachings of the present disclosure provide, among other things, an improved user experience by expanding the user inputs processable by a system, thereby enabling the system to provide a user with increased information.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system 100 for determining when opinion-based information is to be used to generate a response to a user input, as well as for generating a response to the user input using opinion-based information. The system 100 may include a user device 110, local to a user 105, in communication with a system component(s) 120 via a network(s) 199. The network(s) 199 may include the Internet and/or any other wide- or local-area network, and may include wired, wireless, and/or cellular network hardware.

The system component(s) 120 may include various components. With reference to FIG. 1, the system component(s) 120 may include a dialog context component 130, a dialog context storage 140, a opinion component 147, an entity extraction component 150, a opinion-based information selection component 160, a sentiment detection component 180, an opinion-based information knowledge base 190, and a response generation component 170. Further components of the system component(s) 120 are illustrated in and described with respect to FIG. 4.

While FIG. 1 illustrates the system component(s) 120 implementing the dialog context component 130, the dialog context storage 140, the opinion component 147, the entity extraction component 150, the opinion-based information selection component 160, the sentiment detection component 180, the opinion-based information knowledge base 190, and the response generation component 170, the present disclosure is not limited thereto. The present disclosure also envisions configurations of the system 100 in which the user device 110 implements one or more of the dialog context component 130, the dialog context storage 140, the opinion component 147, the entity extraction component 150, the opinion-based information selection component 160, the sentiment detection component 180, the opinion-based information knowledge base 190, and the response generation component 170.

As illustrated in FIG. 1, the dialog context component 130 may receive input data 127 corresponding to a user input received by the user device 110. Prior to the dialog context component 130 receiving the input data 127, the user device 110 may, send to the system component(s) 120, user input data (not illustrated) representing the user input. The user input data may include various types of data. For example, the input data 127 may include input audio data when the user input is a spoken natural language user input, or input text (or tokenized) data when the user input is a typed natural language user input.

If the user input data includes input audio data, the system component(s) 120 may, upon receiving the user input data from the user device 110, perform automatic speech recognition (ASR) processing on the input audio data to generate ASR output data including text or tokenized data representing a transcript of the spoken natural language user input. Further details of how the ASR processing may be performed are described in detail herein below with respect to FIG. 4. The input data 127, input to the dialog context component 130, may include the foregoing ASR output data, or the input text (or tokenized) data as received from the user device 110, in the situation where the user input is a typed natural language user input.

The dialog context component 130 may be configured to generate dialog context data 135 representing the user input, represented by the input data 127, and one or more previous user inputs and/or system outputs, received during a dialog between the system 100 and the user 105 (and/or received during a previous dialog between the system 100 and the user 105).

As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog context component 130 may generate the dialog context data 135 using dialog context data 145, received from the dialog context storage 140, and the input data 127. The dialog context storage 140 may store dialog context data for one or more dialogs, where the dialog context data for a single dialog may include data representing one or more turn(s) of the dialog. The dialog context component 130 may be configured to query the dialog context storage 140 for the dialog context data 145. For example, the dialog context component 130 may query the dialog context storage 140 using a user identifier of the user 105 and/or a device identifier of the user device 110 and/or a dialog identifier associated with the input data 127. The dialog context component 130 may use the dialog context data 145 and the input data 127 to generate the dialog context data 135 (e.g., by concatenating the dialog context data 145 and the input data 127, appending the input data 127 to the dialog context data 145, etc.).

In some embodiments the dialog context data 135 (and/or the dialog context data 145) may include information determined during one or more previous system-user interactions. For example, the dialog context data 135 (and/or the dialog context data 145) may include one or more instances of NLU output data including at least an intent representing a corresponding user input, a domain associated with the user input, one or more entities included in the user input (determined, for example, using NER processing (e.g., by an entity resolver 670 discussed with respect to FIG. 6)), etc.

The dialog context component 130 may send the dialog context data 135 to the opinion component 147.

The opinion component 147 may be configured to process the dialog context data 135 to determine whether generation of a response to the present user input, represented by the input data 127, requires the use of opinion-based information. For example, the opinion component 147 may be capable of determining that generation of a response to the user input "how long is the wait time at ABC restaurant" does not require use of opinion-based information, but determine that generation of a response to the user input "how is the attentiveness of the staff at ABC restaurant" does require use of opinion-based information.

In some embodiments, the opinion component 147 may implement a machine learning (ML) model configured to determine whether generation of a response, to a user input, requires use of opinion-based information. For example, the ML model may be configured to take as input the dialog context data 135 and output an indication of whether generation of a response to the present user input, represented in the input data 127, requires use of opinion-based information. In some embodiments, the indication may be a score. For example, an output of less than 0.5 may indicates that opinion-based information is not required, whereas an output of 0.5 or higher may indicate opinion-based information is required. The ML model may be trained using supervised learning methods. For example, during training, the ML model may receive a training input pair including natural language data (e.g., text or tokens) and an indication of whether generation of a response, to the natural language data, requires use of opinion-based information, and the ML model may be tasked with properly predicting whether generation of a response, to natural language data, requires uses of opinion-based information. Based on whether the ML model's prediction matches the indication included in the training input pair, the ML model may be configured (or reconfigured) accordingly (e.g., based on a cross-entropy loss). In some embodiments, the ML model may take as input an encoded representation of the dialog context.

If the opinion component 147 determines that generation of a response to the present user input requires use of opinion-based information, then the opinion component 147 may send the dialog context data 135 to the entity extraction component 150. Conversely, if the opinion component 147 determines that generation of a response to the user input does not require opinion-based information, then the system component(s) 120 and/or the user device 110 may determine a response to the user input by processing as described herein below with respect to FIGS. 4 and 5 (e.g., using the NLU component 460/560 and skill component 490/590 and/or skill system component(s) 125, or using the dialog manager component 472/572).

The entity extraction component 150 may take as input the dialog context data 135 and determine entity data 155 including entity(ies) determined to be included in the opinion-based information knowledge base 190 and similar to the entity(ies) included in the dialog context data 135. Processing of the entity extraction component 150 is described in further detail herein below with respect to FIG. 2.

Figure 2:
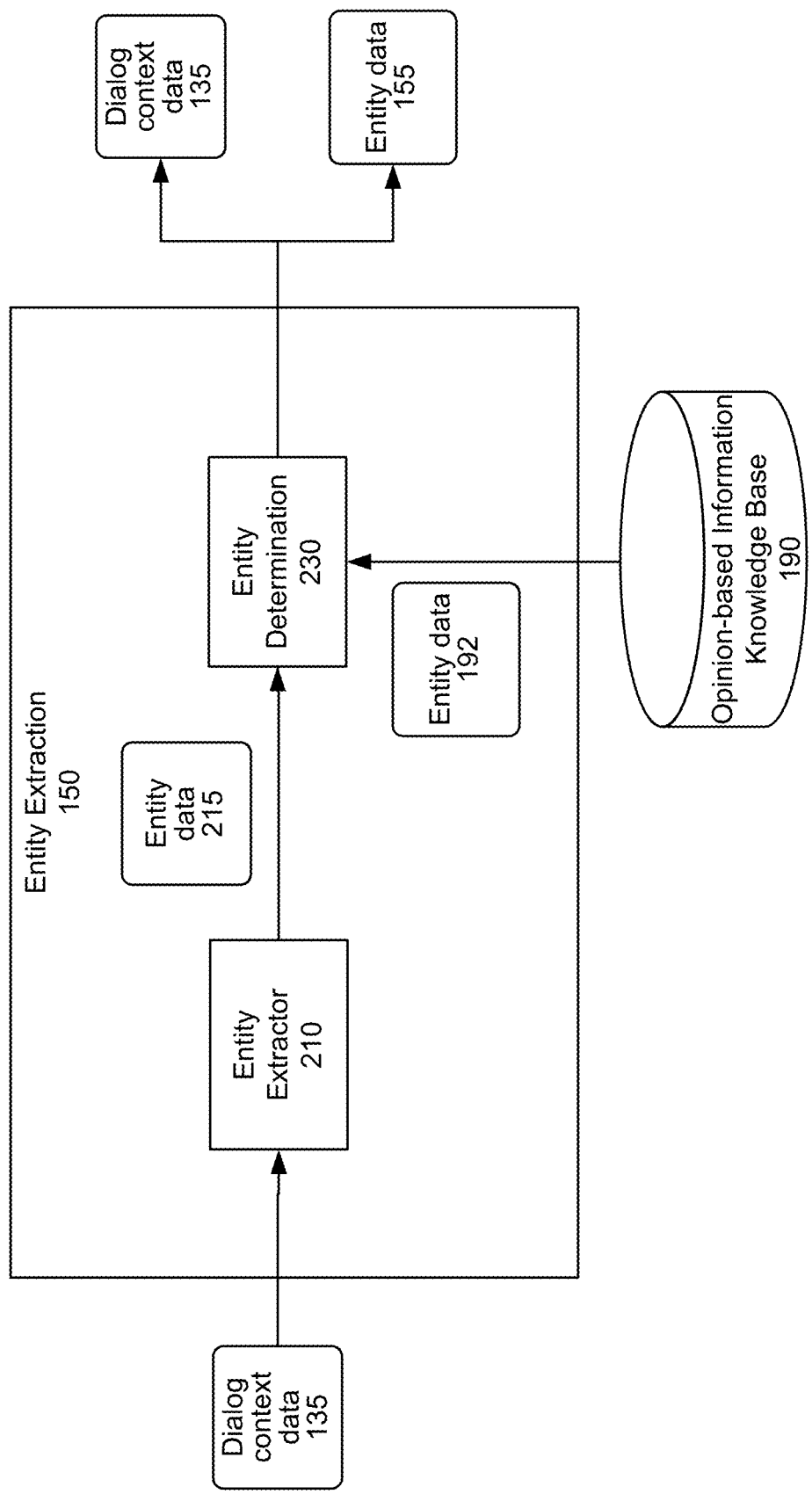
FIG. 2 is a conceptual diagram illustrating the structure of and processing performed by an entity extraction component, according to embodiments of the present disclosure.

FIG. 2 illustrates processing performed by the entity extraction component 150 to determine the entity data 155. As illustrated in FIG. 2, the entity extraction component 150 may include an entity extractor component 210 and an entity determination component 230, which may be in communication with a opinion-based information knowledge base 190.

The entity extractor component 210 may receive the dialog context data 135 and determine entity data 215 corresponding to one or more entities included in the dialog context data 135. For example, the entity extractor component may include one or more named entity recognition (NER) components (not illustrated) which may identify portions of the dialog context data 135 that correspond to a named entity associated with a domain, associated with a recognizer implementing the entity recognition component. The NER component may also determine whether a word refers to an entity whose identity is not explicitly mentioned in the text data, for example "him," "her," "it" or other anaphora, exophora, or the like.

Each recognizer, and more specifically each NER component, may be associated with a particular grammar database, a particular set of intents/actions, and a particular personalized lexicon. The grammar databases, and intents/actions may be stored in an NLU storage. Each gazetteer may include domain/skill-indexed lexical information associated with a particular user and/or user device 110. For example, a user's music domain lexical information might include album titles, artist names, and song names, for example, whereas a user's communications domain lexical information might include the names of contacts. Since every user's music collection and contact list is presumably different. This personalized information improves later performed entity resolution.

An NER component applies grammar information and lexical information associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.).

Each grammar database includes the names of entities (i.e., nouns) commonly found in speech about the particular domain to which the grammar database relates, whereas the lexical information is personalized to the user and/or the user device 110 from which the user input originated. For example, a grammar database associated with a shopping domain may include a database of words commonly used when people discuss shopping.

A downstream process called entity resolution (discussed in detail elsewhere herein) links a slot of text data to a specific entity known to the system. To perform entity resolution, the entity extraction component 150 may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways. The entity extractor component 210 may send the entity data 215 to the entity determination component 230.

In embodiments where the dialog context data 135 includes information determined during one or more previous system-user interactions (e.g., one or more instances of NLU output data including at least an intent representing a corresponding user input, a domain associated with the user input, one or more entities included in the user input, etc.), the entity extraction component 150 may be configured to determine the entity data 215 using the information included in the dialog context data 135, and without using the entity extractor component 210. For example, the information may include one or more entities determined during the one or more previous system-user interactions, and the entity determination component 230 may perform processing with respect to those entities, rather than receiving the entity data 215 from the entity extractor component 210. In some embodiments, the dialog context data 135 may include the aforementioned information, and the entity extractor component 210 may still perform processing with respect to dialog context data 135 to determine entity data 215. In such embodiments, the entity extractor component 210 may use the information included in the dialog context data 135 to determine the entity data 215.

The entity determination component 230 may be configured to determine entity data 155 corresponding to one or more entities included in the opinion-based information knowledge base 190 that are semantically similar and/or identical to the one or more entities represented in the entity data 215. In some embodiments, the entity determination component 230 may determine the entity data 155, including the one or more entities determined to be semantically similar and/or identical to the one or more entities represented in the entity data 215, using a word-based matching method (e.g., fuzzy n-gram matching, or the like). For example, the entity determination component 230 may query the opinion-based information knowledge base 190 for entity data 192 corresponding to one or more entities, based on the entity data 215, and generate the entity data 155 using the entity data 215 and the entity data 192 (e.g., using fuzzy n-gram matching techniques). For further example, in some embodiments, the one or more entities included in the opinion-based information knowledge base 190 may be associated with an entity type indicator (e.g., a person, place, thing, etc.). The entity determination component 230 may query the opinion-based information knowledge base 190 for the entity data 192 including one or more entity types corresponding to the entity type indicator, and may then generate the entity data 155 using the entity data 215 and the entity data 192 (e.g., using fuzzy n-gram matching techniques).

The opinion-based information knowledge base 190 may include a plurality of opinion-based information in the form of natural language data (e.g., paragraphs, sentences, portions of sentences, sub-sentential units, etc.) associated with one or more users. In some embodiments, the plurality of opinion-based information may include information associated with web articles, web pages, narratives, user reviews, user comments, etc. For example, the plurality of opinion-based information may include information from/derived from the web articles, web pages, narratives, user reviews, user comments, etc. In some embodiments, opinion-based information may be stored in the opinion-based information knowledge base 190 in association with one or more entities associated with the opinion-based information. Generally, opinion-based information may include information from/derived from user (input) data with respect to an entity.

In some embodiments, the plurality of opinion-based information may include information from/derived from multimodal information (e.g., two or more of text data, audio data, and video data). In the instance that opinion-based information is from/derived from audio data, the system 100 may perform language processing (e.g., ASR processing) on the audio data to determine ASR output data corresponding to a transcript of the audio data, and store the ASR output data as the opinion-based information. In the instance that opinion-based information is from/derived from text data, the system 100 may store the text data as the opinion-based information. In the instance that opinion-based information is from/derived from video data, the system 100 may determine an audio data portion of the video data, perform language processing (e.g., ASR processing) on the audio data portion to determine ASR output data corresponding to a transcript of speech in the audio data portion, and store the ASR output data as the opinion-based information.

The opinion-based information, included in the opinion-based information knowledge base 190, may include a representation (e.g., natural language data, annotation, label, tag, etc.) of at least an entity type (e.g., a topic/subject) included in the opinion-based information and/or a sentiment associated with the opinion-based information. For example, the opinion-based information "the Wi-Fi speeds were top-notch" may be associated with an entity type of "Wi-Fi quality", and optionally a sentiment label of "great," representing the sentiment of the opinion-based information and the entity type to which the opinion-based information corresponds. For further example, the opinion-based information "the Wi-Fi speeds were top-notch" may be associated with natural language data such as "the Wi-Fi quality was great," representing the entity type and the sentiment. In some embodiments, an instance of opinion-based information, included in the opinion-based information knowledge base 190, may correspond to a single entity type and be associated with a single sentiment label. In some embodiments, the representation of the entity type and/or sentiment for the opinion-based information included in the opinion-based information knowledge base 190 may be manually determined by a user.

As shown in FIG. 1, the opinion-based information knowledge base 190 may receive the representation of the entity type and/or the sentiment associated with the opinion-based information from the sentiment detection component 180 (as the sentiment data 185). The opinion-based information knowledge base 190 may send opinion-based information to the sentiment detection component 180 to determine the sentiment data 185. In some embodiments, the sentiment detection component 180 may determine the sentiment data 185 and send the sentiment data 185 and the corresponding opinion-based information to the opinion-based information knowledge base 190. In other embodiments, the sentiment detection component 180 may determine the sentiment data 185 and combine (e.g., append, concatenate, etc.) the sentiment data 185 and the opinion-based information before sending the combined data to the opinion-based information knowledge base 190.

In some embodiments, the opinion-based information knowledge base 190 may query the sentiment detection component 180 for the sentiment data 185 during runtime. For example, in response to receiving a request for opinion-based information (e.g., from the opinion-based information selection component 160, as discussed herein below), the opinion-based information knowledge base 190 may query the sentiment detection component 180 for the sentiment data 185. In other embodiments, the opinion-based information knowledge base 190 may query the sentiment detection component 180 for the sentiment data 185 during downtime (e.g., when offline). For example, when new opinion-based information is stored in the opinion-based information knowledge base 190, the opinion-based information knowledge base 190 may send the opinion-based information to the sentiment detection component 180 during downtime to determine the sentiment data 185.

In some embodiments, the sentiment data 185 (e.g., the entity type and/or the sentiment associated with an instance of opinion-based information) may be determined using a ML model. For example, the ML model may be configured to predict the sentiment associated with a natural language input, and output a sentiment of the natural language input, and the entity type to which the sentiment and the natural language input corresponds. During training, the ML model may receive a natural language training input associated with a sentiment and corresponding to an entity type, and may be tasked with predicting the sentiment (e.g., positive, negative, etc.), and the entity type to which the sentiment corresponds. In some embodiments, the ML model may further generate a natural language output corresponding to the entity category and a representation of the sentiment (e.g., "great," "ok," "bad," etc.) For example, for the natural language input "The food was scrumptious," the natural language output may be "The food was great." In some embodiments, the ML model may be a Bidirectional Auto-Regressive Transformer (BART)-based model (e.g., PGEN). In some embodiments, the sentiment associated with the instance of opinion-based information may be determined using a first ML model, and the entity type, to which the sentiment corresponds, may be determined using a second ML model. For example, the first ML model may be configured to predict the sentiment associated with a natural language input, and output a sentiment of the natural language input. The second ML model may be configured to process the natural language input and the predicted sentiment of the natural language input to predict an entity type to which the natural language input and the sentiment correspond. In some embodiments, the second ML model may further generate a natural language output corresponding to the entity category and a representation of the sentiment.

The entity extraction component 150 may send the dialog context data 135 and the entity data 155 to the opinion-based information selection component 160.

The opinion-based information selection component 160 may be configured to take as input the dialog context data 135 and the entity data 155, and determine opinion-based information data 165 including one or more instances of natural language data that are associated with the one or more entities represented in the entity data 155, and which the opinion-based information selection component 160 has determined is responsive to the user input represented in the input data 127.

Figure 3:
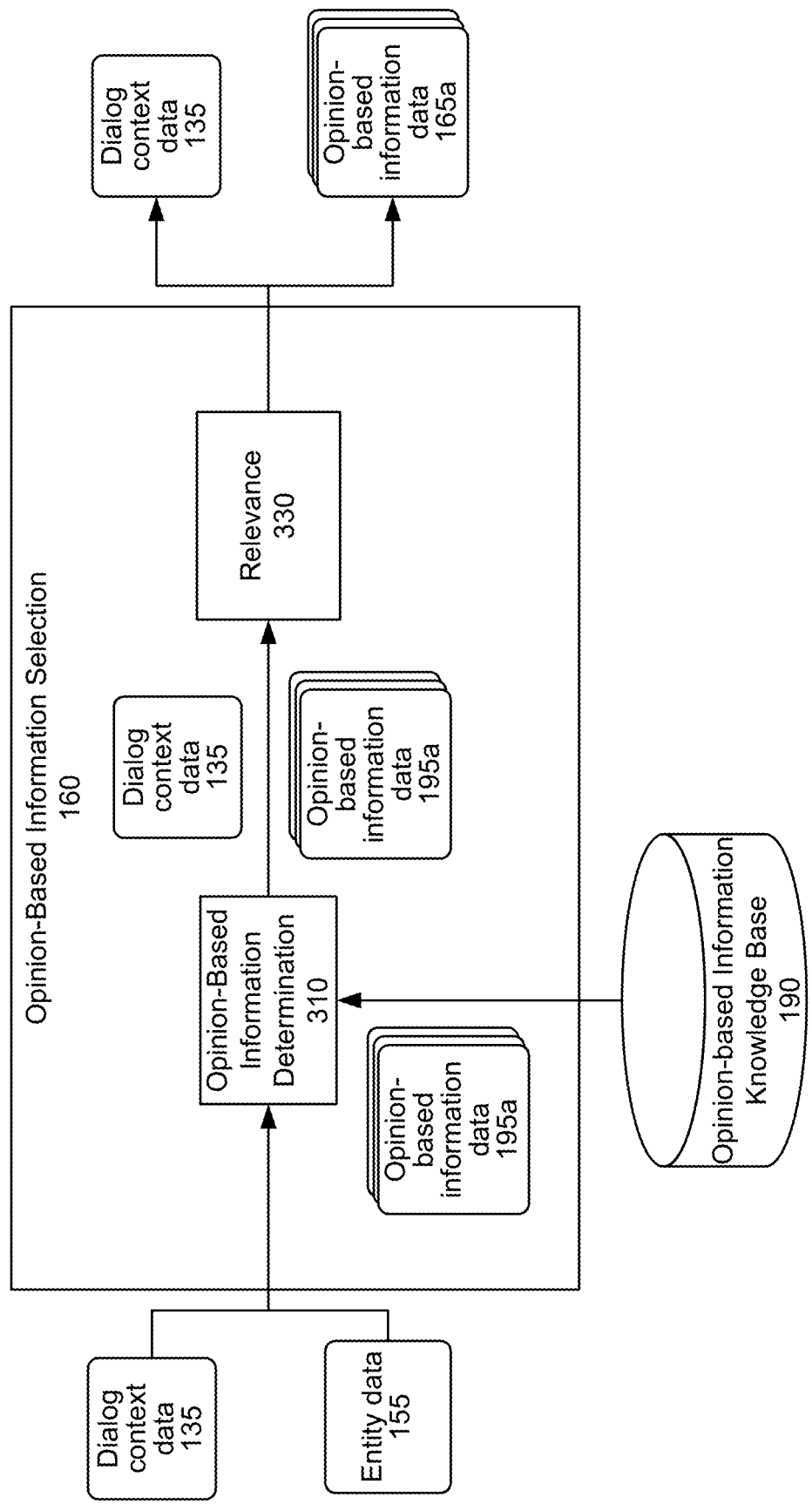
FIG. 3 is a conceptual diagram illustrating the structure of and processing performed by a opinion-based information selection component, according to embodiments of the present disclosure.

FIG. 3 illustrates example components and processing of the opinion-based information selection component 160. The opinion-based information selection component 160 may include a opinion-based information determination component 310, in communication with the opinion-based information knowledge base 190, and a relevance component 330.

The opinion-based information determination component 310 may be configured to take as input the dialog context data 135 and the entity data 155, and determine one or more instances of opinion-based information data 195, stored in the opinion-based information knowledge base 190, which include the entity(ies) included in the entity data 215. For example, if the entity data 215 includes the entity "ABC restaurant," then the opinion-based information determination component 310 may determine the opinion-based information data 195a "the food at the ABC restaurant was exquisite" in the opinion-based information knowledge base 190, based on the opinion-based information data 195a including the entity "ABC restaurant." For further example, if the entity data 215 includes the entity "hospitality," then the opinion-based information determination component 310 may determine the opinion-based information data 195b "the hospitality at the front desk was somewhat lacking" in the opinion-based information knowledge base 190, based on the opinion-based information data 195b including the entity "hospitality".

In some embodiments, the opinion-based information knowledge base 190 may be structured such that opinion-based information data 195 may be stored in association with one or more entities. In such embodiments, the opinion-based information determination component 310 may query the opinion-based information knowledge base 190 for opinion-based information data 195 associated with the entity data 215.

In some embodiments, the opinion-based information determination component 310 may be configured to query the opinion-based information knowledge base 190 for all opinion-based information data 195 associated with the entity(ies) included in the entity data 155. As discussed herein above, the opinion-based information data 195 may include a tag/label representing an entity type and sentiment associated with the opinion-based information data 195 and/or natural language data representing the sentiment and the entity type to which the sentiment corresponds. The opinion-based information determination component 310 may send the opinion-based information data 195 to the relevance component 330.

The relevance component 330 may be configured to take as input the dialog context data 135 and the opinion-based information data 195 and determine the opinion-based information data 165 corresponding to one or more instances of the opinion-based information data 195 that are responsive to the input data 127. For example, the relevance component 330 may be configured to determine that, for the dialog context data 135 including the input data 127 "how is the food at the ABC hotel," the opinion-based information data 195a "we tried the restaurant attached to the ABC hotel, because we heard they had excellent food, it did not disappoint" is relevant to the dialog context data 135, because it includes information that may be used to determine a response to the input data 127. In contrast, the relevance component 330 may be configured to determine that the opinion-based information data 195b "we enjoyed staying at the ABC hotel, but we wish we had an opportunity to try the food downstairs" is irrelevant, because it does not include information that may be used to determine a response to the input data 127.

The relevance component 330 may be configured to determine the opinion-based information data 165 using a ML model. The ML model may be configured to take as input the dialog context data 135 and an instance of the opinion-based information data 195, and determine whether the instance of the opinion-based information data 195 is responsive to the input data 127. For example, the ML model may be trained to separately encode the dialog context data 135 and the instance of the opinion-based information data 195 to determine an encoded representation of the dialog context data 135 and an encoded representation of the instance of the opinion-based information data 195, and use a classifier to determine a probability that the opinion-based information data 195 is responsive to the input data 127. For further example, the ML model may be trained to concatenate the dialog context data 135 and the instance of the opinion-based information data 195 to determine a concatenated input, encode the concatenated input to determine an encoded representation of the concatenated input, and use a classifier trained to determine a probability that the opinion-based information data 195 is responsive to the input data 127.

As discussed herein above, the opinion-based information data 165 may include a representation of an entity type and/or sentiment associated with the opinion-based information data 165 and/or natural language data representing the sentiment and the entity type to which the sentiment corresponds. In some embodiments, the opinion-based information data 165 may not include the representation of the entity type and/or sentiment. In such cases, the opinion-based information selection component 160 may be configured to send the opinion-based information data 165 to the sentiment detection component 180 to determine the sentiment data 185, corresponding to the opinion-based information data 165, at runtime. The sentiment detection component 180 may determine the sentiment data 185 and send the sentiment data 185 and the corresponding opinion-based information to the opinion-based information selection component 160, which may determine the opinion-based information data 165 including the sentiment data 185. In other embodiments, the sentiment detection component 180 may determine the sentiment data 185 and combine (e.g., append, concatenate, etc.) the sentiment data 185 and the opinion-based information before sending the combined data to the opinion-based information selection component 160.

The relevance component 330 may send the dialog context data 135 and the opinion-based information data 165 to the response generation component 170.

The response generation component 170 may be configured to take as input the dialog context data 135 and the opinion-based information data 165, and generate output data 175 responsive to the user input represented in the input data 127. In some embodiments, the output data 175 may include a summary(ies) of the sentiment(s) associated with the opinion-based information data 165.

Similar to the NLG component 479, discussed herein below with respect to FIG. 4, the response generation component 170 may be configured to generate natural language text (or tokens) for purposes of TTS output to a user, except that the response generation component 170 may be further configured to generate the natural language text (or tokens) using the opinion-based information data 165. The response generation component 170 may be configured to take as input the dialog context data 135 and the opinion-based information data 165, and generate output data 175 therefrom. The output data 175 may correspond to or include natural language data including at least a portion of the opinion-based information data 165. For example, if the input data 127 represents the user input "does the ABC hotel have good Wi-Fi," and the opinion-based information data 165 includes "they had fast Wi-Fi and a great top floor view," and "they had stable Wi-Fi and, even better, it was fast," then the output data 175 may include "yes, the hotel's Wi-Fi has been rated as being both fast and stable."

In some embodiments, the response generation component 170 may be configured to determine the output data 175 using the representation of the entity type and/or the sentiment included in the opinion-based information data 165. For example, if the opinion-based information data 165 includes "they had stable Wi-Fi and, even better, it was fast," then the response generation component 170 may use the representation of the entity type (e.g., "Wi-Fi") and sentiment (e.g., "great") to determine that the opinion-based information data 165 represents a positive sentiment associated with the entity type of "Wi-Fi."

In some embodiments, the opinion-based information data 165 may not include the representation of the entity type and/or sentiment. In such cases, the response generation component 170 may be configured to send the opinion-based information data 165 to the sentiment detection component 180 to determine the sentiment data 185, corresponding to the opinion-based information data 165, at runtime. The sentiment detection component 180 may determine the sentiment data 185 and send the sentiment data 185 and the corresponding opinion-based information to the response generation component 170, which may determine the opinion-based information data 165 including the sentiment data 185. In other embodiments, the sentiment detection component 180 may determine the sentiment data 185 and combine (e.g., append, concatenate, etc.) the sentiment data 185 and the opinion-based information before sending the combined data to the response generation component 170.

In some embodiments, the opinion-based information data 165 may include more than one instance of opinion-based information (e.g., more than one instance of natural language data) determined to be responsive to the input data 127. In some situations, the more than one instance of opinion-based information may include representations of different (e.g., contrasting) sentiments for the same entity type. For example, the opinion-based information data 165 may include two instances of natural language data, where one instance is associated with a positive sentiment for an entity type, and the second instance is associated with a negative sentiment for the same entity type. In such situations, the response generation component 170 may be configured to determine output data 175 including a representation of the different (e.g., contrasting) sentiments (e.g., a comparison of the sentiments) associated with the entity type. For example, the output data 175 may include a representation of the number of instances of opinion-based information that are associated with each sentiment, such as "most guests said that the Wi-Fi was stable and fast, but a few guests said they had issues connecting to the Wi-Fi," or "15 guests said that the Wi-Fi was stable and fast, but 5 guests said they had issues connecting to the Wi-Fi." In some embodiments, the output data 175 may include a percentage representation of the different sentiments. For example, the output data 175 may correspond to "75% of the guests said that the Wi-Fi was stable and fast, but 25% said they had issues connecting to the Wi-Fi."

The response generation component 170 may generate the output data 175 using a ML model. For example, the ML model may take as input the dialog context data 135 and the opinion-based information data 165, and may generate the output data 175 therefrom. In some embodiments, the ML model may be trained in an unsupervised manner. During training, the ML model may receive a training input pair including natural language dialog context data and one or more instances of opinion-based information including or otherwise referring to an entity included in the natural language dialog context data. In some embodiments, the one or more instances of opinion-based information may include a representation of a sentiment of the corresponding opinion-based information. For example, the opinion-based information may correspond to "the food was delicious" and the representation of the sentiment of the opinion-based information may be "great." The ML model may be tasked with generating natural language output data (e.g., the output data 175). In some embodiments, the ML model may be a decoder-only model (e.g., GPT-2) or an encoder-decoder model (e.g., a BART-based model).

In some embodiments, the input data 127 may represent a user input requesting content requiring use of opinion-based information associated with more than one entity. For example, the user input may be "how is the Wi-Fi at ABC hotel compared to the Wi-Fi at DEF hotel," where the two entities in this example are "ABC hotel" and "DEF hotel." In such embodiments, the response generation component 170 may be configured to determine output data 175 including a comparison between opinion-based information data associated with the first entity and opinion-based information data associated with the second entity. For example, output data 175 responsive to the abovementioned user input may include "overall, customers thought the Wi-Fi at the ABC hotel is fast, while the Wi-Fi at the DEF hotel may be slow and unstable." As another example, the user input may be "which hotel in the area is the best," where the entities in this example are any hotel in the area. In such embodiments, the response generation component 170 may be configured to determine output data 175 including a comparison between opinion-based subjective information data associated with each hotel proximate to the user 105 (or the area specified by the user 105). For example, output data 175 responsive to the abovementioned user input may include "The majority of guests rate the XYZ hotel the best due to its free, reliable Wi-Fi and because it has a pool, although some guests report that the ABC hotel is the most cost-efficient, on the other hand the DEF hotel has been rated as not worth the price."

In some embodiments, the response generation component 170 may generate the output data 175 including the comparison of opinion-based information data associated with the more than one entity using a ML model. For example, for a situation where the input data 127 represents a request to output content requiring opinion-based information associated with two entities, the ML model may take as input the dialog context data 135, the entity data 155 for the first entity, opinion-based information data associated with the first entity, the entity data 155 for the second entity, and subj opinion-based information data associated with the second entity, and may generate the output data 175 including the comparison of the opinion-based information data associated with the first and second entities. During training, the ML model may receive a training pair including (1) a first encoded representation of a first entity, a first instance of opinion-based information data associated with the first entity, and natural language dialog data associated with a dialog; and (2) a second encoded representation of a second entity, a second instance of opinion-based information data associated with the second entity, and the natural language dialog data. The ML model may concatenate the first and second encoded representations, and decode the concatenated representation to generate natural language output data responsive to the natural language dialog data (e.g., the output data 175), where the natural language output data represents a comparison of the opinion-based information data associated with the first and second entities. In some embodiments, the ML model may correspond to a fusion-in decoder.

The output data 175 may be presented to the user 105 using the user device 110 or another user device associated with the same user or group profile. For example, the output data 175 may be presented as synthesized speech (i.e., audio) and/or displayed content (e.g., text, an image, etc.). In some embodiments, the output data 175 may be sent to the dialog manager component 472/572 for use thereby.

In some embodiments, the response generation component 170 may be included in the NLG component 479/579.

Figure 4:
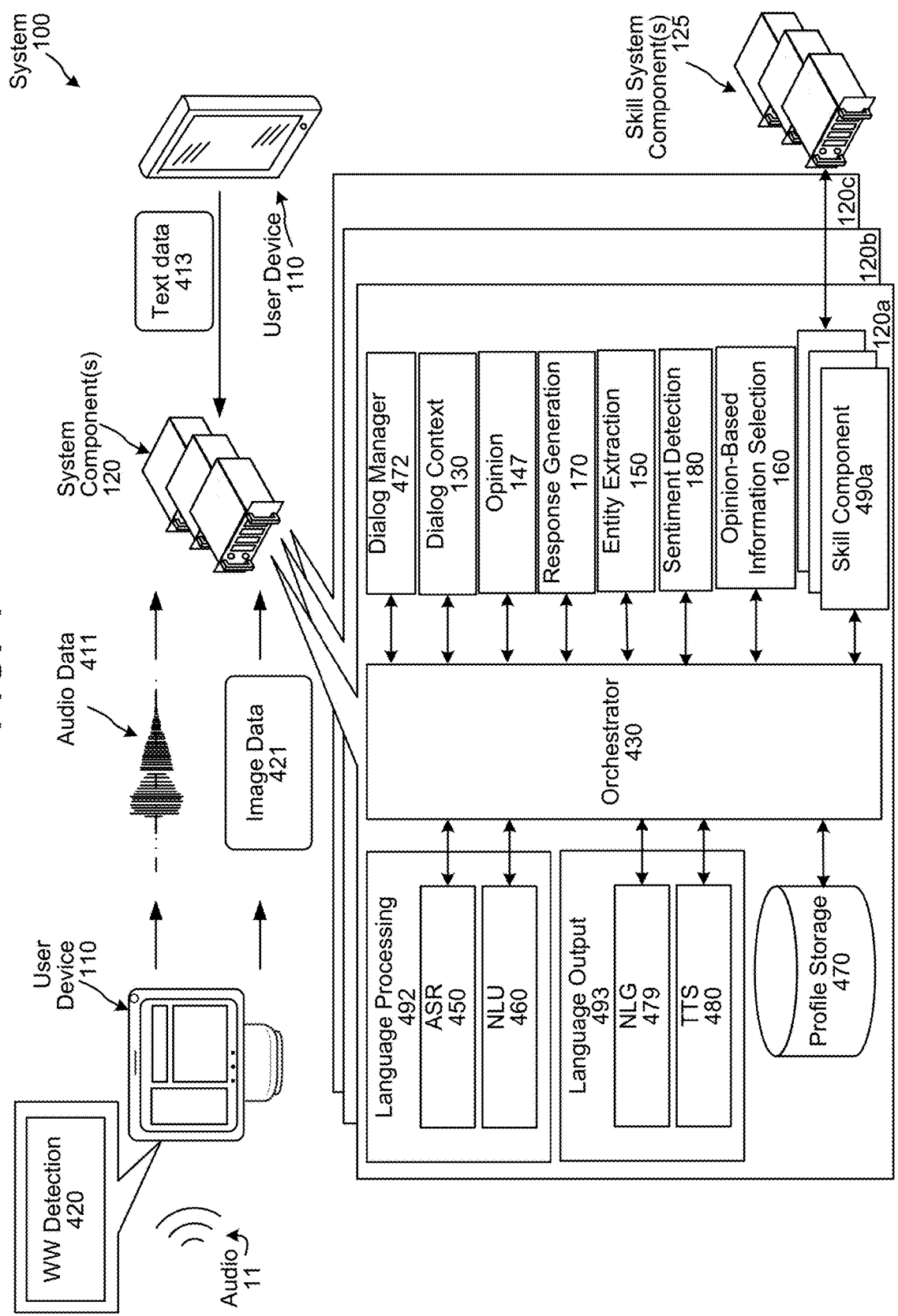
FIG. 4 is a conceptual diagram of components of the system, according to embodiments of the present disclosure.

The system 100 may operate using various components as described in FIG. 4. The various components may be located on same or different physical devices. Communication between various components may occur directly or across a network(s) 199. The user device 110 may include audio capture component(s), such as a microphone or array of microphones of a user device 110, captures audio 11 and creates corresponding audio data. Once speech is detected in audio data representing the audio 11, the user device 110 may determine if the speech is directed at the user device 110/system component(s) 120. In at least some embodiments, such determination may be made using a wakeword detection component 420. The wakeword detection component 420 may be configured to detect various wakewords. In at least some examples, each wakeword may correspond to a name of a different digital assistant. An example wakeword/digital assistant name is "Alexa." In another example, input to the system may be in form of text data 413, for example as a result of a user typing an input into a user interface of user device 110. Other input forms may include indication that the user has pressed a physical or virtual button on user device 110, the user has made a gesture, etc. The user device 110 may also capture images using camera(s) 718 of the user device 110 and may send image data 421 representing those image(s) to the system component(s) 120. The image data 421 may include raw image data or image data processed by the user device 110 before sending to the system component(s) 120. The image data 421 may be used in various manners by different components of the system to perform operations such as determining whether a user is directing an utterance to the system, interpreting a user command, responding to a user command, etc.

The wakeword detection component 420 of the user device 110 may process the audio data, representing the audio 11, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 420 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 420 and/or input is detected by an input detector, the user device 110 may "wake" and begin transmitting audio data 411, representing the audio 11, to the system component(s) 120. The audio data 411 may include data corresponding to the wakeword; in other embodiments, the portion of the audio corresponding to the wakeword is removed by the user device 110 prior to sending the audio data 411 to the system component(s) 120. In the case of touch input detection or gesture based input detection, the audio data may not include a wakeword.

In some implementations, the system 100 may include more than one system component(s) 120. The system component(s) 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detection component 420 may result in sending audio data to system component(s) 120a for processing while detection of the wakeword "Computer" by the wakeword detector may result in sending audio data to system component(s) 120b for processing. The system may have a separate wakeword and system for different skills/systems (e.g., "Dungeon Master" for a game play skill/system component(s) 120c) and/or such skills/systems may be coordinated by one or more skill component(s) 490 of one or more system component(s) 120.

The user device 110 may also include a system directed input detector. The system component(s) 120 may also include a system directed input detector. The system directed input detector may be configured to determine whether an input to the system (for example speech, a gesture, etc.) is directed to the system or not directed to the system (for example directed to another user, etc.). The system directed input detector may work in conjunction with the wakeword detection component 420. If the system directed input detector determines an input is directed to the system, the user device 110 may "wake" and begin sending captured data for further processing (for example, processing audio data using the language processing 492/592, processing captured image data using image processing component, or the like). If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector is determining whether an input is potentially device directed. For example, the system may output an orange indicator while considering an input, and may output a green indicator if a system directed input is detected. Other such configurations are possible.

Upon receipt by the system component(s) 120, the audio data 411 may be sent to an orchestrator component 430. The orchestrator component 430 may include memory and logic that enables the orchestrator component 430 to transmit various pieces and forms of data to various components of the system, as well as perform other operations as described herein.

The orchestrator component 430 may send the audio data 411 to a language processing component 492. The language processing component 492 (sometimes also referred to as a spoken language understanding (SLU) component) includes an automatic speech recognition (ASR) component 450 and a natural language understanding (NLU) component 460. The ASR component 450 may transcribe the audio data 411 into text data. The text data output by the ASR component 450 represents one or more than one (e.g., in the form of an N-best list) ASR hypotheses representing speech represented in the audio data 411. The ASR component 450 interprets the speech in the audio data 411 based on a similarity between the audio data 411 and pre-established language models. For example, the ASR component 450 may compare the audio data 411 with models for sounds (e.g., acoustic units such as phonemes, senons, phones, etc.) and sequences of sounds to identify words that match the sequence of sounds of the speech represented in the audio data 411. The ASR component 450 sends the text data generated thereby to an NLU component 460, via, in some embodiments, the orchestrator component 430. The text data sent from the ASR component 450 to the NLU component 460 may include a single top-scoring ASR hypothesis or may include an N-best list including multiple top-scoring ASR hypotheses. An N-best list may additionally include a respective score associated with each ASR hypothesis represented therein.

The language processing system 492 may further include a NLU component 460. The NLU component 460 may receive the text data from the ASR component. The NLU component 460 may attempts to make a semantic interpretation of the phrase(s) or statement(s) represented in the text data input therein by determining one or more meanings associated with the phrase(s) or statement(s) represented in the text data. The NLU component 460 may determine an intent representing an action that a user desires be performed and may determine information that allows a device (e.g., the user device 110, the system component(s) 120, a skill component 490, a skill system component(s) 125, etc.) to execute the intent. For example, if the text data corresponds to "play the 5th Symphony by Beethoven," the NLU component 460 may determine an intent that the system output music and may identify "Beethoven" as an artist/composer and "5th Symphony" as the piece of music to be played. For further example, if the text data corresponds to "what is the weather," the NLU component 460 may determine an intent that the system output weather information associated with a geographic location of the user device 110. In another example, if the text data corresponds to "turn off the lights," the NLU component 460 may determine an intent that the system turn off lights associated with the user device 110 or the user 5. However, if the NLU component 460 is unable to resolve the entity—for example, because the entity is referred to by anaphora such as "this song" or "my next appointment"—the language processing system 492 can send a decode request to another language processing system 492 for information regarding the entity mention and/or other context related to the utterance. The language processing system 492 may augment, correct, or base results data upon the audio data 411 as well as any data received from the other language processing system 492.

The NLU component 460 may return NLU results data (which may include tagged text data, indicators of intent, etc.) back to the orchestrator component 430. The orchestrator component 430 may forward the NLU results data to a skill component(s) 490. If the NLU results data includes a single NLU hypothesis, the NLU component 460 and the orchestrator component 430 may direct the NLU results data to the skill component(s) 490 associated with the NLU hypothesis. If the NLU results data includes an N-best list of NLU hypotheses, the NLU component 460 and the orchestrator component 430 may direct the top scoring NLU hypothesis to a skill component(s) 490 associated with the top scoring NLU hypothesis. The system may also include a post-NLU ranker which may incorporate other information to rank potential interpretations determined by the NLU component 460. The local user device 110 may also include its own post-NLU ranker, which may operate similarly to the post-NLU ranker.

A skill component may be software running on the system component(s) 120 that is akin to a software application. That is, a skill component 490 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 490. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 490 may operate in conjunction between the system component(s) 120 and other devices, such as the user device 110, in order to complete certain functions. Inputs to a skill component 490 may come from speech processing interactions or through other interactions or input sources. A skill component 490 may include hardware, software, firmware, or the like that may be dedicated to a particular skill component 490 or shared among different skill components 490.

A skill support system component(s) 125 may communicate with a skill component(s) 490 within the system component(s) 120 and/or directly with the orchestrator component 430 or with other components. A skill support system component(s) 125 may be configured to perform one or more actions. An ability to perform such action(s) may sometimes be referred to as a "skill." That is, a skill may enable a skill support system component(s) 125 to execute specific functionality in order to provide data or perform some other action requested by a user. For example, a weather service skill may enable a skill support system component(s) 125 to provide weather information to the system component(s) 120, a car service skill may enable a skill support system component(s) 125 to book a trip with respect to a taxi or ride sharing service, an order pizza skill may enable a skill support system component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 490 dedicated to interacting with the skill support system component(s) 125. Unless expressly stated otherwise, reference to a skill, skill device, or skill component may include a skill component 490 operated by the system component(s) 120 and/or skill operated by the skill support system component(s) 125. Moreover, the functionality described herein as a skill or skill may be referred to using many different terms, such as an action, bot, app, or the like. The skill component 490 and or skill support system component(s) 125 may return output data to the orchestrator component 430.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 472 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 472 may associate a dialog session identifier with the dialog upon identifying that the user is engaging in a dialog with the user. The dialog manager component 472 may track a user input and the corresponding system generated response to the user input as a turn. The dialog session identifier may correspond to multiple turns of user input and corresponding system generated response. The dialog manager component 472 may transmit data identified by the dialog session identifier directly to the orchestrator component 430 or other component. Depending on system configuration the dialog manager component 472 may determine the appropriate system generated response to give to a particular utterance or user input of a turn. Or creation of the system generated response may be managed by another component of the system (e.g., the language output component 493, NLG component 479, orchestrator component 430, etc.) while the dialog manager component 472 selects the appropriate responses. Alternatively, another component of the system component(s) 120 may select responses using techniques discussed herein. The text of a system generated response may be sent to a TTS component 480 for creation of audio data corresponding to the response. The audio data may then be sent to a user device (e.g., user device 110) for ultimate output to the user. Alternatively (or in addition) a dialog response may be returned in text or some other form.

The dialog manager component 472 may receive the ASR hypothesis/hypotheses (i.e., text data) and make a semantic interpretation of the phrase(s) or statement(s) represented therein. That is, the dialog manager component 472 determines one or more meanings associated with the phrase(s) or statement(s) represented in the text data based on words represented in the text data. The dialog manager component 472 determines a goal corresponding to an action that a user desires be performed as well as pieces of the text data that allow a device (e.g., the user device 110, the system component(s) 120, a skill component 490, a skill system component(s) 125, etc.) to execute the intent. If, for example, the text data corresponds to "what is the weather," the dialog manager component 472 may determine that that the system component(s) 120 is to output weather information associated with a geographic location of the user device 110. In another example, if the text data corresponds to "turn off the lights," the dialog manager component 472 may determine that the system component(s) 120 is to turn off lights associated with the device(s) 110 or the user(s) 5.

The dialog manager component 472 may send the results data to one or more skill component(s) 490. If the results data includes a single hypothesis, the orchestrator component 430 may send the results data to the skill component(s) 490 associated with the hypothesis. If the results data includes an N-best list of hypotheses, the orchestrator component 430 may send the top scoring hypothesis to a skill component(s) 490 associated with the top scoring hypothesis.

The system component(s) 120 includes a language output component 493. The language output component 493 includes a natural language generation (NLG) component 479 and a text-to-speech (TTS) component 480. The NLG component 479 can generate text for purposes of TTS output to a user. For example the NLG component 479 may generate text corresponding to instructions corresponding to a particular action for the user to perform. The NLG component 479 may generate appropriate text for various outputs as described herein. The NLG component 479 may include one or more trained models configured to output text appropriate for a particular input. The text output by the NLG component 479 may become input for the TTS component 480 (e.g., output text data discussed below). Alternatively or in addition, the TTS component 480 may receive text data from a skill component 490 or other system component for output.

The NLG component 479 may include a trained model. The NLG component 479 generates text data from dialog data received by the dialog manager component 472 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the TTS component 480.

The TTS component 480 may generate audio data (e.g., synthesized speech) from text data using one or more different methods. Text data input to the TTS component 480 may come from a skill component 490, the orchestrator component 430, or another component of the system. In one method of synthesis called unit selection, the TTS component 480 matches text data against a database of recorded speech. The TTS component 480 selects matching units of recorded speech and concatenates the units together to form audio data. In another method of synthesis called parametric synthesis, the TTS component 480 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 5 to request capture of image or video data. The user device 110 may process the commands locally or send audio data 411 representing the commands to the system component(s) 120 for processing, after which the system component(s) 120 may return output data that can cause the user device 110 to engage its camera.

Upon receipt by the system component(s) 120, the image data 421 may be sent to an orchestrator component 430. The orchestrator component 430 may send the image data 421 to an image processing component. The image processing component can perform computer vision functions such as object recognition, modeling, reconstruction, etc. For example, the image processing component may detect a person, face, etc. (which may then be identified using a user recognition component). The device may also include an image processing component which operates similarly to image processing component.

In some implementations, the image processing component can detect the presence of text in an image. In such implementations, the image processing component can recognize the presence of text, convert the image data to text data, and send the resulting text data via the orchestrator component 430 to the language processing component 492 for processing by the NLU component 460.

The system component(s) 120 may include a user recognition component that recognizes one or more users using a variety of data. However, the disclosure is not limited thereto, and the user device 110 may include a user recognition component instead of and/or in addition to user recognition component of the system component(s) 120 without departing from the disclosure.

The user recognition component may take as input the audio data 411 and/or text data output by the ASR component 450. The user recognition component may perform user recognition by comparing audio characteristics in the audio data 411 to stored audio characteristics of users. The user recognition component may also perform user recognition by comparing biometric data (e.g., fingerprint data, iris data, etc.), received by the system in correlation with the present user input, to stored biometric data of users assuming user permission and previous authorization. The user recognition component may further perform user recognition by comparing image data (e.g., including a representation of at least a feature of a user), received by the system in correlation with the present user input, with stored image data including representations of features of different users. The user recognition component may perform additional user recognition processes, including those known in the art.

The user recognition component determines scores indicating whether user input originated from a particular user. For example, a first score may indicate a likelihood that the user input originated from a first user, a second score may indicate a likelihood that the user input originated from a second user, etc. The user recognition component also determines an overall confidence regarding the accuracy of user recognition operations.

Output of the user recognition component may include a single user identifier corresponding to the most likely user that originated the user input. Alternatively, output of the user recognition component may include an N-best list of user identifiers with respective scores indicating likelihoods of respective users originating the user input. The output of the user recognition component may be used to inform NLU processing as well as processing performed by other components of the system.

The system component(s) 120/user device 110 may include a presence detection component that determines the presence and/or location of one or more users using a variety of data.

The system 100 (either on user device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

In some embodiments, the sentiment detection component 180 may be configured to detect a sentiment of a user from image data representing an image of the user, and/or the like. The sentiment detection component 180 may be included in system component(s) 120, as illustrated in FIG. 4, although the disclosure is not limited thereto and the sentiment detection component 180 may be included in other components without departing from the disclosure. For example, the sentiment detection component 180 may be included in the user device 110, as a separate component, etc. The system component(s) 120 may use the sentiment detection component 180 to, for example, customize a response for a user based on an indication that the user is happy or frustrated.

Figure 5:
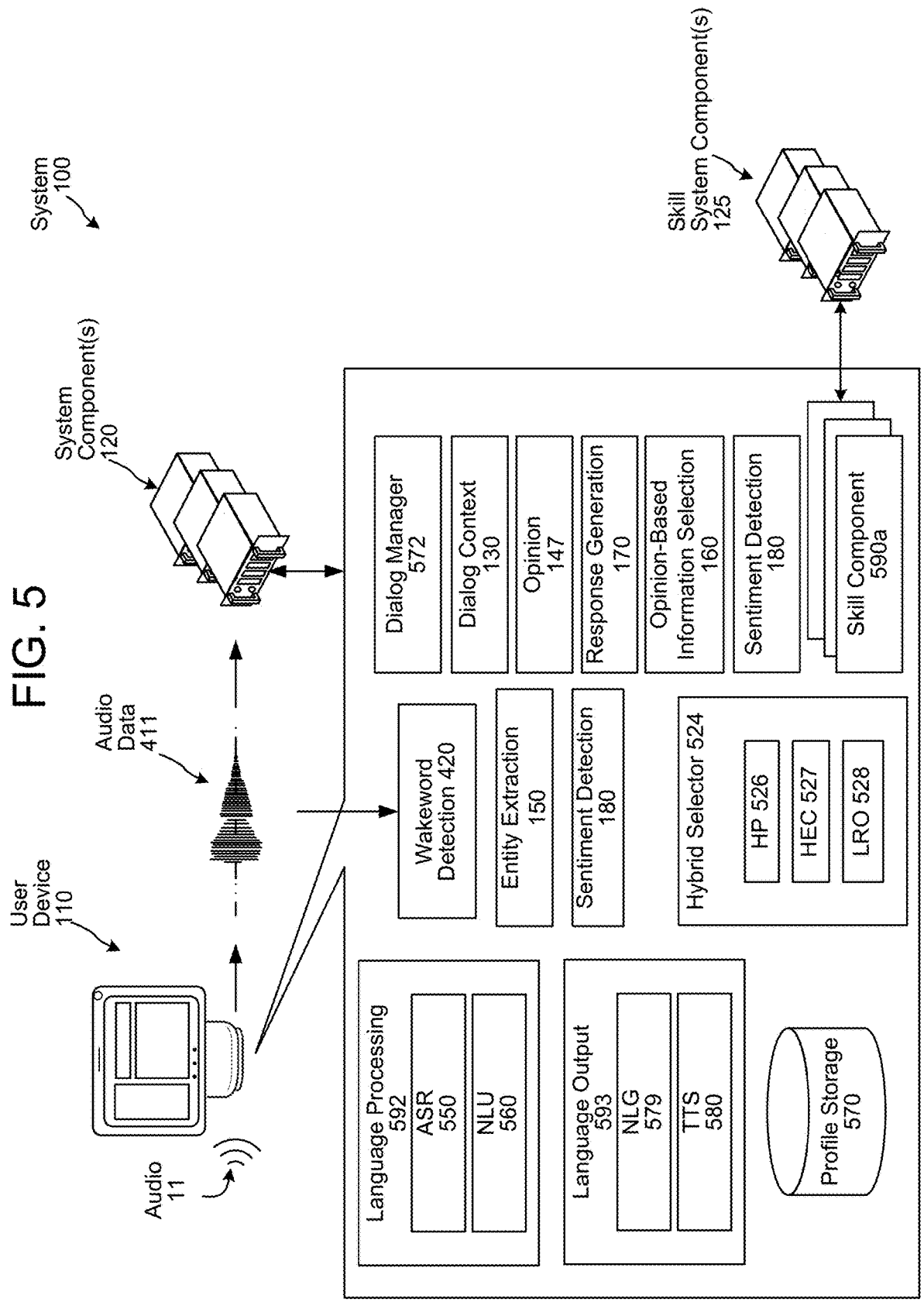
FIG. 5 is a conceptual diagram illustrating components that may be included in a device, according to embodiments of the present disclosure.

Although the components of FIG. 4 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 5 illustrates such a configured user device 110.

In at least some embodiments, the system component(s) 120 may receive the audio data 411 from the user device 110, to recognize speech corresponding to a spoken input in the received audio data 411, and to perform functions in response to the recognized speech. In at least some embodiments, these functions involve sending directives (e.g., commands), from the system component(s) 120 to the user device 110 (and/or other devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) 120 over the network(s) 199, some or all of the functions capable of being performed by the system component(s) 120 may be performed by sending one or more directives over the network(s) 199 to the user device 110, which, in turn, may process the directive(s) and perform one or more corresponding actions. For example, the system component(s) 120, using a remote directive that is included in response data (e.g., a remote response), may instruct the user device 110 to output an audible response (e.g., using TTS processing performed by an on-device TTS component 580) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 4, the user device 110 may include a wakeword detection component 420 configured to compare the audio data 411 to stored models used to detect a wakeword (e.g., "Alexa") that indicates to the user device 110 that the audio data 411 is to be processed for determining NLU output data (e.g., slot data that corresponds to a named entity, label data, and/or intent data, etc.). In at least some embodiments, a hybrid selector 524, of the user device 110, may send the audio data 411 to the wakeword detection component 420. If the wakeword detection component 420 detects a wakeword in the audio data 411, the wakeword detection component 420 may send an indication of such detection to the hybrid selector 524. In response to receiving the indication, the hybrid selector 524 may send the audio data 411 to the system component(s) 120 and/or the ASR component 550. The wakeword detection component 420 may also send an indication, to the hybrid selector 524, representing a wakeword was not detected. In response to receiving such an indication, the hybrid selector 524 may refrain from sending the audio data 411 to the system component(s) 120, and may prevent the ASR component 550 from further processing the audio data 411. In this situation, the audio data 411 can be discarded.

The user device 110 may conduct its own speech processing using on-device language processing components, such as an SLU/language processing component 592 (which may include an ASR component 550 and an NLU component 560), similar to the manner discussed herein with respect to the SLU component 492 (or ASR component 450 and the NLU component 460) of the system component(s) 120. Language processing component 592 may operate similarly to language processing component 492, ASR component 550 may operate similarly to ASR component 450 and NLU component 560 may operate similarly to NLU component 460. The user device 110 may also internally include, or otherwise have access to, other components such as one or more skill components 590 capable of executing commands based on NLU output data or other results determined by the user device 110/system component(s) 120 (which may operate similarly to skill components 490), a user recognition component (configured to process in a similar manner to that discussed herein with respect to the user recognition component of the system component(s) 120), profile storage 570 (configured to store similar profile data to that discussed herein with respect to the profile storage 470 of the system component(s) 120), or other components. In at least some embodiments, the profile storage 570 may only store profile data for a user or group of users specifically associated with the user device 110. Similar to as described above with respect to skill component 490, a skill component 590 may communicate with a skill system component(s) 125. The user device 110 may also have its own language output component 593 which may include NLG component 579 and TTS component 580. Language output component 593 may operate similarly to language output component 493, NLG component 579 may operate similarly to NLG component 479 and TTS component 580 may operate similarly to TTS component 480.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s) 120.

The hybrid selector 524, of the user device 110, may include a hybrid proxy (HP) 526 configured to proxy traffic to/from the system component(s) 120. For example, the HP 526 may be configured to send messages to/from a hybrid execution controller (HEC) 527 of the hybrid selector 524. For example, command/directive data received from the system component(s) 120 can be sent to the HEC 527 using the HP 526. The HP 526 may also be configured to allow the audio data 411 to pass to the system component(s) 120 while also receiving (e.g., intercepting) this audio data 411 and sending the audio data 411 to the HEC 527.

In at least some embodiments, the hybrid selector 524 may further include a local request orchestrator (LRO) 528 configured to notify the ASR component 550 about the availability of new audio data 411 that represents user speech, and to otherwise initiate the operations of local language processing when new audio data 411 becomes available. In general, the hybrid selector 524 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) 120 and chooses to use that remotely-determined directive data.

Thus, when the audio data 411 is received, the HP 526 may allow the audio data 411 to pass through to the system component(s) 120 and the HP 526 may also input the audio data 411 to the on-device ASR component 550 by routing the audio data 411 through the HEC 527 of the hybrid selector 524, whereby the LRO 528 notifies the ASR component 550 of the audio data 411. At this point, the hybrid selector 524 may wait for response data from either or both of the system component(s) 120 or the local language processing components. However, the disclosure is not limited thereto, and in some examples the hybrid selector 524 may send the audio data 411 only to the local ASR component 550 without departing from the disclosure. For example, the user device 110 may process the audio data 411 locally without sending the audio data 411 to the system component(s) 120.

The local ASR component 550 is configured to receive the audio data 411 from the hybrid selector 524, and to recognize speech in the audio data 411, and the local NLU component 560 is configured to determine a user intent from the recognized speech, and to determine how to act on the user intent by generating NLU output data which may include directive data (e.g., instructing a component to perform an action). Such NLU output data may take a form similar to that as determined by the NLU component 460 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 560) may be selected as usable to respond to a natural language user input, and local response data may be sent (e.g., local NLU output data, local knowledge base information, internet search results, and/or local directive data) to the hybrid selector 524, such as a "ReadyToExecute" response. The hybrid selector 524 may then determine whether to use directive data from the on-device components to respond to the natural language user input, to use directive data received from the system component(s) 120, assuming a remote response is even received (e.g., when the user device 110 is able to access the system component(s) 120 over the network(s) 199), or to determine output audio requesting additional information from the user 5.

The user device 110 and/or the system component(s) 120 may associate a unique identifier with each natural language user input. The user device 110 may include the unique identifier when sending the audio data 411 to the system component(s) 120, and the response data from the system component(s) 120 may include the unique identifier to identify which natural language user input the response data corresponds.

In at least some embodiments, the user device 110 may include, or be configured to use, one or more skill components 590 that may work similarly to the skill component(s) 490 implemented by the system component(s) 120. The skill component(s) 590 may correspond to one or more domains that are used in order to determine how to act on a spoken input in a particular way, such as by outputting a directive that corresponds to the determined intent, and which can be processed to implement the desired operation. The skill component(s) 590 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 125. For example, a skill system component(s) 125 may be located in a remote environment (e.g., separate location) such that the user device 110 may only communicate with the skill system component(s) 125 via the network(s) 199. However, the disclosure is not limited thereto. For example, in at least some embodiments, a skill system component(s) 125 may be configured in a local environment (e.g., home server and/or the like) such that the user device 110 may communicate with the skill system component(s) 125 via a private network, such as a local area network (LAN).

As used herein, a "skill" may refer to a skill component 590, a skill system component(s) 125, or a combination of a skill component 590 and a corresponding skill system component(s) 125.

Similar to the manner discussed with regard to FIG. 4, the local user device 110 may be configured to recognize multiple different wakewords and/or perform different categories of tasks depending on the wakeword. Such different wakewords may invoke different processing components of local user device 110 (not illustrated in FIG. 5). For example, detection of the wakeword "Alexa" by the wakeword detection component 420 may result in sending audio data to certain language processing components 592/skill components 590 for processing while detection of the wakeword "Computer" by the wakeword detector may result in sending audio data to different language processing components 592/skill components 590 for processing.

The NLU component 460 may perform NLU processing described above with respect to domains associated with skills wholly implemented as part of the system component(s) 120 (e.g., designated 490 in FIG. 4). The NLU component 460 may separately perform NLU processing described above with respect to domains associated with skills that are at least partially implemented as part of the skill system component(s) 125.

Although the opinion-based information knowledge base 190 is not illustrated in FIGS. 4 and 5, it is to be appreciated that, based on the present disclosure herein, that the opinion-based information knowledge base 190 may be included in the system component(s) 120 and/or the user device 110.

Figure 6:
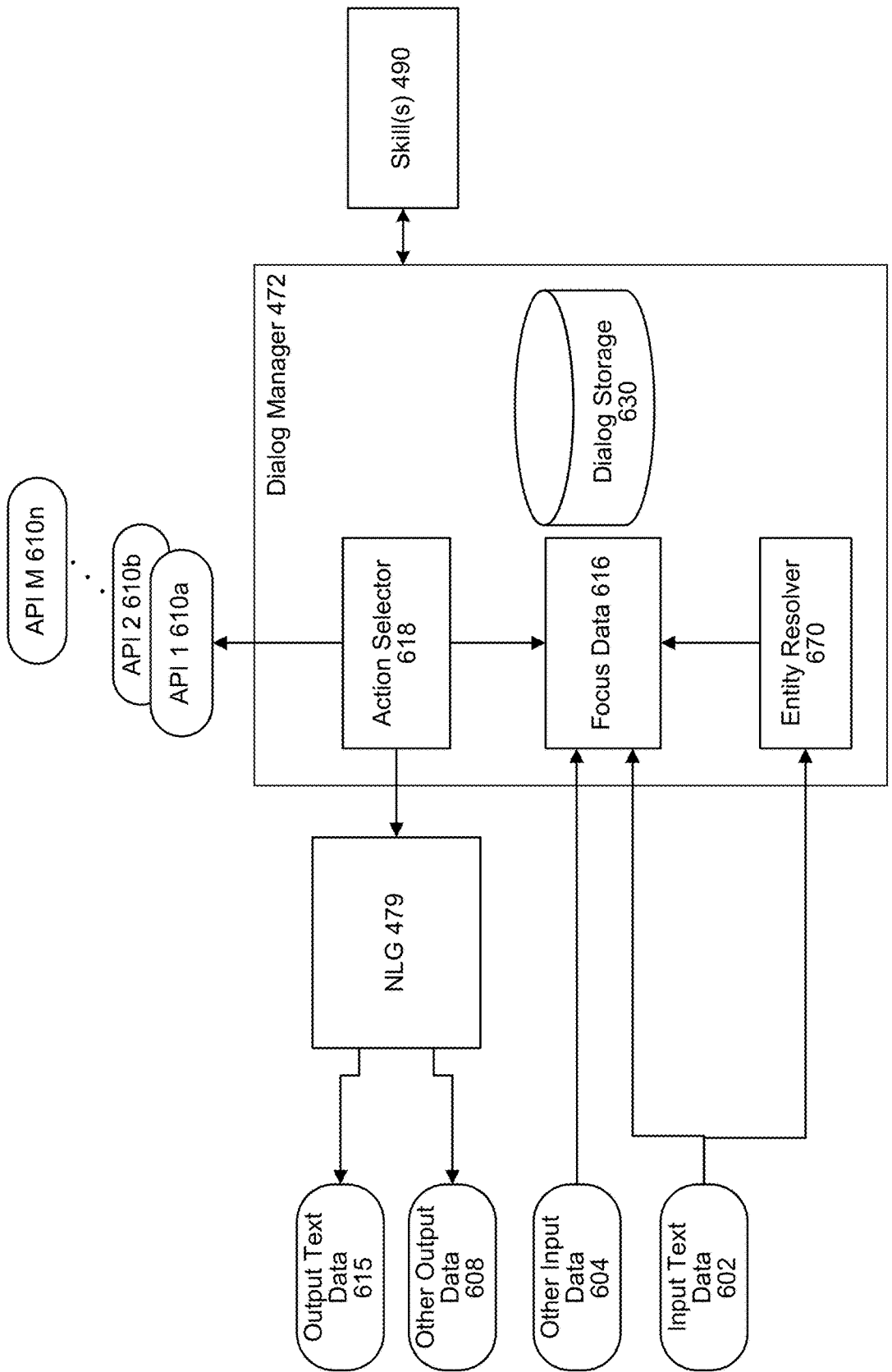
FIG. 6 is a conceptual diagram of components of a dialog manager component, according to embodiments of the present disclosure.

FIG. 6 illustrate operations to handle dialog management, according to embodiments of the present disclosure. One or more components shown in FIG. 6 may be part of the dialog manager component 472. For example, the dialog manager component 472 may include the entity resolver 670, the dialog focus data component 616 and the action selector 618. The dialog manager component 472 may work in concert with other language processing components, for example NLU 460, or may operate instead of such components in certain embodiments.

The system receives input text data 602 which may be received, for example, by a device (e.g., 413) or from another component of the system (for example as ASR output data). The input text data 602 may include text corresponding to a user input and metadata indicating further information about the text (such as an identity of the user for example determined by a user recognition component), an emotional state of the user (for example determined by sentiment detection component 180, etc.). The input text data 602 may be text representing words, instructions, markup language, speech, or gestures, or may be a vector or other representation of the same. The input text data 602 may be generated by a user via a keyboard, touchscreen, microphone, camera, or other such input device. In other embodiments, the input text data 602 is created using ASR, as described above, from audio data received from a user. The system may further receive other input data 604, which may correspond to a button press, gesture, or other input, such as image data as may interpreted by user device 110, system component(s) 120, or other component (for example an image processing component). As described in greater detail below, using the input text data 602 and/or other input data 604, the system may determine and output text data 615 and/or other output data 608. The system may instead or in addition perform an action based on the input text data 602 and/or other input data 604, such as calling one or more APIs 610.

An entity resolver 670 may be used to determine that the input text data 602 includes a representation of one or more entities, a process that may include named entity recognition (NER)—i.e., determining that the input text data 602 includes the representation—and entity resolution (ER)—i.e., identifying a meaning or context of the entity, such as associating an identity of a person based on a recognized nickname. An entity may be a person, place, thing, idea, and/or goal; example entities include proper names, nicknames, business names, place names, and/or application names.

In some embodiments, a single entity resolver 670 is used for more than one domain (i.e., a "cross-domain" entity resolver 670). Each domain may correspond to one or more dialog models. One or more candidate domains corresponding to the input text data 602 may be determined; entity resolvers 670 corresponding to the candidate domains may be used to process the input text data 602. The dialog focus data component 616 may store the output entities from each candidate domain and may remove unselected entities when an API 610 is selected or an action to be performed is determined.

The dialog focus data component 616 may store state data (for example in dialog storage 630) corresponding to dialog history data (including an intent(s), an entity(ies), etc. corresponding to a prior turn in the dialog), action history data, and/or other data. In some embodiments, the other components (e.g., the action selector 618) do not store state data and instead query the dialog focus data component 616 for the state data. The system may send some or all of the dialog focus data component 616 to other systems and/or may receive additional dialog focus data from other systems. In some embodiments, the other components (e.g., the action selector 618) include a feature-extractor component to extract features from the dialog focus data component 616.

The dialog focus data component 616 may be graph-based data including a plurality of graph nodes; each graph node may correspond to an item of state data, such as an entity type, entity value, prior API call, and/or user data. The other components, such as the action selector 618, may access all of the graph nodes of the dialog focus data component 616 or may access only a subset of the graph nodes of the dialog focus data component 616. The dialog focus data component 616 may be any type of storage mechanism and may serve as long-term and/or short term memory for the system, thus enabling tracking of entities, ASR output, TTS output, and other features) at each turn through a dialog. In some embodiments, the dialog focus data component 616 is updated after each turn of dialog with updated dialog focus data; in other embodiments, the dialog focus data component 616 is updated after an end of a dialog is determined.

The entity resolver 670 may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain skill components 490 (e.g., a shopping skill, a music skill, a video skill, etc.), or may be organized in a variety of other ways.

The entity resolver 670 may include a ranker component. The ranker component may assign a particular confidence score to each hypothesis input therein. The confidence score of a hypothesis may represent a confidence of the system in the processing performed with respect to the hypothesis. The confidence score of a particular hypothesis may be affected by whether the hypothesis has unfilled slots. For example, if a hypothesis associated with a first skill component includes slots that are all filled/resolved, that NLU hypothesis may be assigned a higher confidence score than another hypothesis including at least some slots that are unfilled/unresolved by the entity resolver 670.

The dialog focus data component 616 may store data relevant to a dialog. In various embodiments, the dialog focus data component 616 stores the input text data 602, other input data 604, entity data from the entity resolver 670 and/or action data and dialog data from an action selector 618. The dialog focus data component 616 may further include additional information, such as location data, user preference data, and environment data. In various embodiments, the dialog focus data component 616 uses an encoder to encode some or all of the received data into one or more feature vectors and a decoder to determine, based on the feature vectors, intent data corresponding to an intent of a user. The dialog focus data component 616 may further include state data that represents prior dialog, actions, or other prior user information or data.

The action selector 618 determines an action to be performed in response to the user request, where the action may include calling an API to perform an action and/or presenting an output to the user. The action selector 618 may include a trained model(s), and may process the dialog focus data component 616. If the action selector 618 determines to invoke an API call, one or more APIs 610 may be activated and a corresponding action carried out. If the action selector 618 determines to present a prompt or other output data to the user, the NLG component 479 may be used to generate the output text data 615 and/or other output data 608. In either case, the action selector 618 may update the dialog focus data component 616 based on the API call or the output presented to the user.

In some embodiments, the action selector 618 may process data from the dialog storage 630 to select one or more skill components 490/skill system component(s) 125 capable of responding to the user request, and present the selected skill to the user using the output text data 615.

In some embodiments, the system component(s) 120 may determine past interaction data, such as a satisfaction rating corresponding to skill component(s) 490 and store it in the dialog storage 630. The satisfaction rating may be based on past interactions between users of the system component(s) 120 and the skill. In some embodiments, the system component(s) 120 may determine a user-specific satisfaction rating corresponding to the skill based on user-specific data, interaction-specific data and/or dialog focus data component 616, such as, user profile data associated with the specific user, location data, past user interactions with the system component(s) 120, past user interactions with the skill component 490, user preferences, device type for the user device 110 that received the user request, device type for the user device 110 that may output/respond to the user request, device capabilities, dialog state of previous turns in the dialog, and other data.

In some embodiments, users may provide feedback to the system component(s) 120 or the skill system component(s) 125 indicating the user's satisfaction in the service skill responding to the user request/performing an action in response to the user request. The feedback may be solicited by the system component(s) 120 or the skill system component(s) 125. In some cases, the feedback may be explicit feedback and may be received as a voice input, text input, gestures, or other types of input. In other cases, the feedback may be implicit feedback and may be determined by processing data related to the user interaction, such as, image data representing the user's facial expression, audio data (representing an utterance from the user) indicating a sentiment/emotion of the user, text data (representing the user input) indicating a sentiment of the user, other sounds/speech indicating the user's emotions/feelings/sentiment (e.g., "ugh" indicating frustration), and other types of data.

The action selector 618 may select a skill based on various other factors, including but not limited to, a user's age, user cohort (user affinities or other social organizations), location information (e.g., where the user input originated, where the user intends to travel to, etc.), skill location data, intent, intent type, time of day the user input is received, time of year the user input is received, and others.

The action selector 618 may select a skill based on skill availability, for example, a reservations at a restaurant may indicate availability or no availability for a particular day. The system component(s) 120/action selector 618 may determine the number of diners at a restaurant or the number of takeout orders a restaurant is handling based on the number of user requests the system component(s) 120 routed to the skill. In another example, the system component(s) 120/action selector 618 may determine that a number of user requests were routed to a first skill for a first location/geographic area (e.g., a city), and may determine to route the next/future user requests to another skill for that geographic area.

For a restaurant reservation, the action selector 618 may select a skill based on a number of people in the user's party, since some restaurants may not make reservations for small parties less than a particular number. The action selector 618 may select a skill based on person(s) other than the user that may be involved in the user request. For example, if the user says "Alexa, what should we do tomorrow?" the system component(s) 120 may determine information relating to the other persons in the user's household to select a skill.

The action selector 618 may select a skill based on the dialog state where the dialog state indicates multiple turns/ attempts to recommend a skill/service provider, and the action selector 618 may modify the search criteria (e.g., expand the zip code, expand the time frame, etc.) to select a skill.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 7:
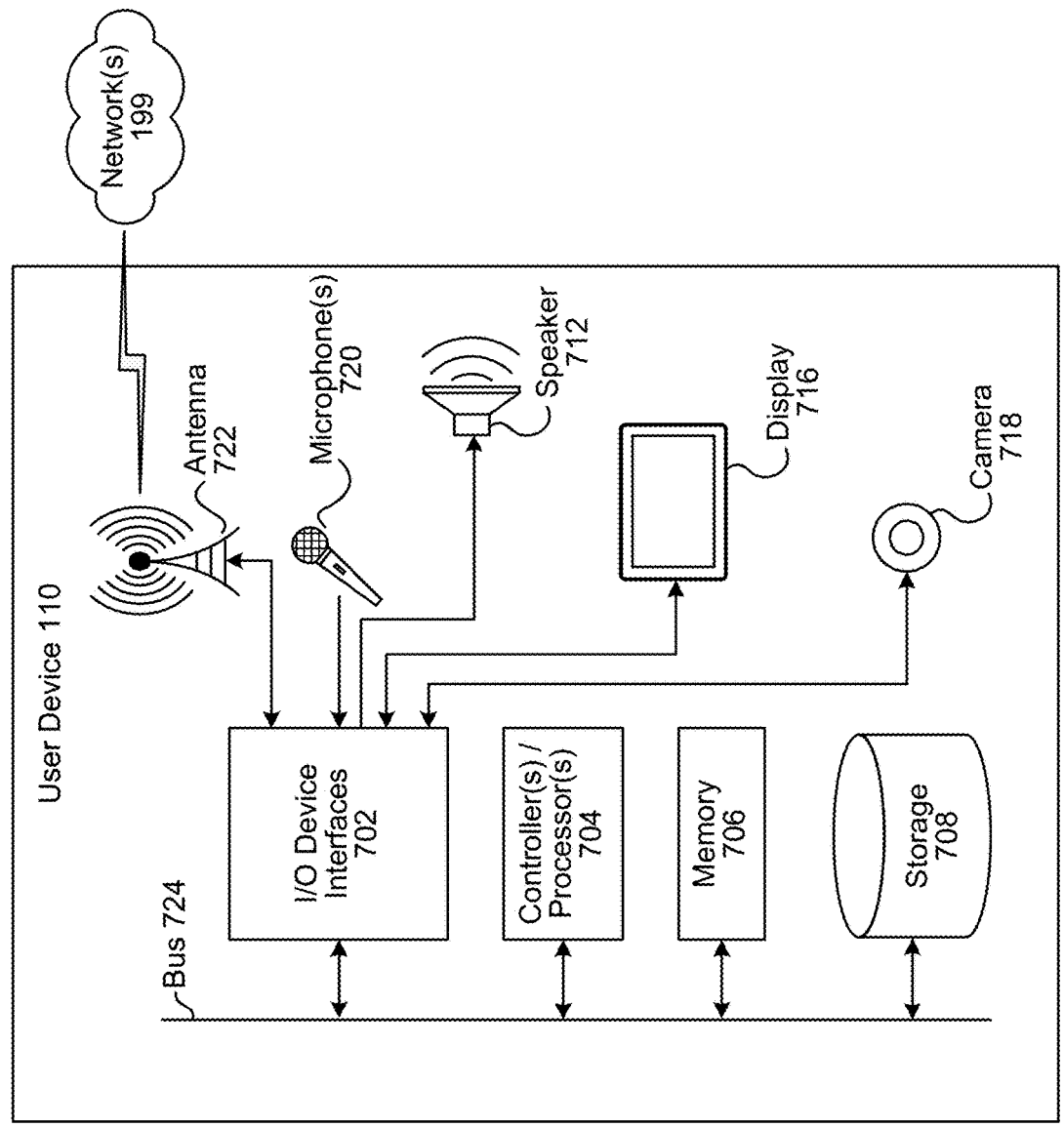
FIG. 7 is a block diagram conceptually illustrating example components of a device, according to embodiments of the present disclosure.
Figure 8:
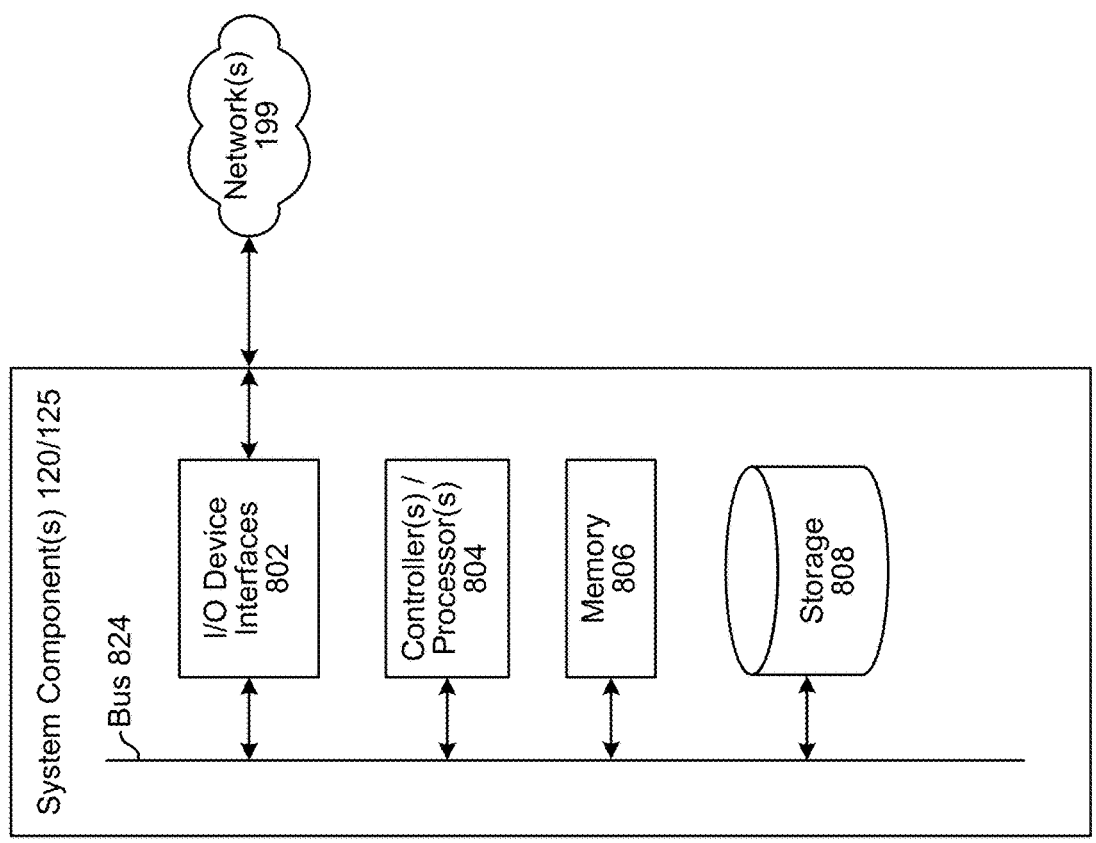
FIG. 8 is a block diagram conceptually illustrating example components of a system, according to embodiments of the present disclosure.

FIG. 7 is a block diagram conceptually illustrating a user device 110 that may be used with the system. FIG. 8 is a block diagram conceptually illustrating example components of a remote device, such as the natural language command processing system component(s) 120, which may assist with ASR processing, NLU processing, etc., and a skill system component(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) 120 may be located remotely from the user device 110 as its operations may not require proximity to the user. The server/system component(s) 120 may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other device(s) 110 in a home/office. One benefit to the server/system component(s) 120 being in a user's home/business is that data used to process a command/return a response may be kept within the user's home, thus reducing potential privacy concerns.

Multiple systems (120/125) may be included in the overall system 100 of the present disclosure, such as one or more natural language processing system component(s) 120 for performing ASR processing, one or more natural language processing system component(s) 120 for performing NLU processing, one or more skill system component(s) 125, etc. In operation, each of these systems may include computer-readable and computer-executable instructions that reside on the respective device (120/125), as will be discussed further below.

Each of these devices (110/120/125) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/125) may also include a data storage component (708/808) for storing data and controller/processor-executable instructions. Each data storage component (708/808) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (702/802).

Computer instructions for operating each device (110/120/125) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/125) includes input/output device interfaces (702/802). A variety of components may be connected through the input/output device interfaces (702/802), as will be discussed further below. Additionally, each device (110/120/125) may include an address/data bus (724/824)

for conveying data among components of the respective device. Each component within a device (110/120/125) may also be directly connected to other components in addition to (or instead of) being connected to other components across the bus (724/824).

Referring to FIG. 7, the user device 110 may include input/output device interfaces 702 that connect to a variety of components such as an audio output component such as a speaker 712, a wired headset or a wireless headset (not illustrated), or other component capable of outputting audio. The user device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 716 for displaying content. The user device 110 may further include a camera 718.

Via antenna(s) 722, the input/output device interfaces 702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device(s) 110, the natural language command processing system component(s) 120, or a skill system component(s) 125 may include their own dedicated processors, memory, and/or storage. Alternatively, one or more of the components of the device(s) 110, the natural language command processing system component(s) 120, or a skill system component(s) 125 may utilize the I/O interfaces (702/802), processor(s) (704/804), memory (706/806), and/or storage (708/808) of the device(s) 110, natural language command processing system component(s) 120, or the skill system component(s) 125, respectively. Thus, the ASR component 450 may have its own I/O interface(s), processor(s), memory, and/or storage; the NLU component 460 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the natural language command processing system component(s) 120, and a skill system component(s) 125, as described herein, are illustrative, and may be located as a stand-alone device or may be included, in whole or in part, as a component of a larger device or system. As can be appreciated, a number of components may exist either on a system component(s) 120 and/or on user device 110. For example, language processing 492/592 (which may include ASR 450/550), language output 493/593 (which may include NLG 479/579 and TTS 480/580), etc., for example as illustrated in FIGS. 4 and 5. Unless expressly noted otherwise, the system version of such components may operate similarly to the device version of such components and thus the description of one version (e.g., the system version or the local version) applies to the description of the other version (e.g., the local version or system version) and vice-versa.

Figure 9:
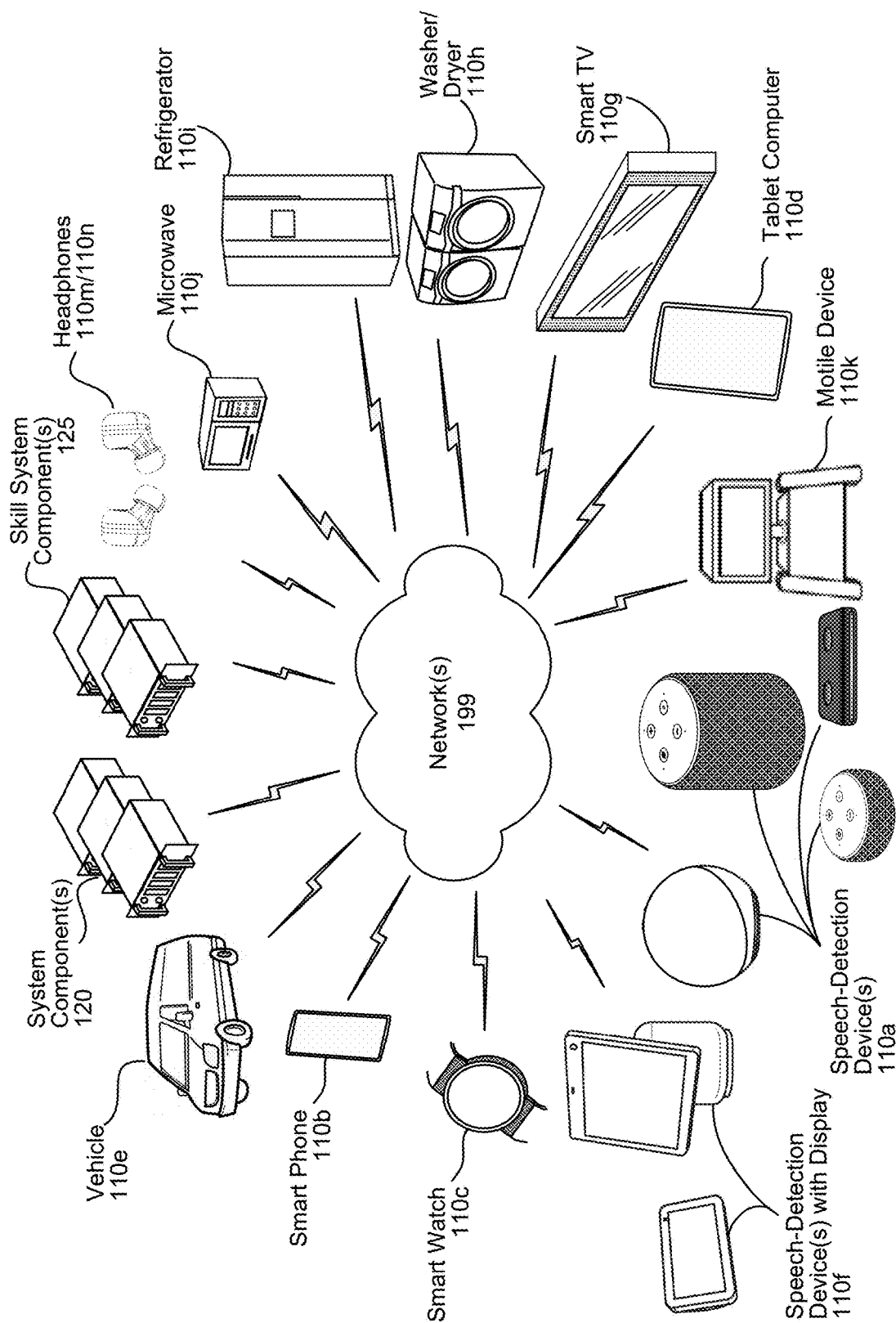
FIG. 9 illustrates an example of a computer network for use with the overall system, according to embodiments of the present disclosure.

As illustrated in FIG. 9, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile user device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 450, the NLU component 460, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving, from a user device, first input audio data corresponding to a first spoken input of a dialog;
    performing automatic speech recognition (ASR) processing using the first input audio data to generate ASR output data including a transcript of the first spoken input;
    determining dialog context data including the ASR output data and previous ASR output data representing at least one previous spoken input of the dialog;
    using a trained classifier, processing the dialog context data to determine that a response to the first spoken input requires use of a knowledge base;
    based on determining that the response to the first spoken input requires use of the knowledge base, determining a first entity, represented in the dialog context data, corresponds to:
        first natural language data in the knowledge base, wherein the first natural language data corresponds to a first user input with respect to the first entity, the first natural language data is associated with a first sentiment, and
        second natural language data in the knowledge base, wherein the second natural language data corresponds to a second user input with respect to the first entity, the second natural language data is associated with a second sentiment; and
    generating first output data responsive to the first spoken input, wherein the first output data summarizes the first sentiment and the second sentiment.

2. The computer-implemented method of claim 1, further comprising:
    performing entity extraction processing on the dialog context data to determine the first entity;
    determining a second entity that is semantically similar to the first entity;
    determining the first natural language data is associated with the second entity in the knowledge base; and
    determining the second natural language data is associated with the second entity in the knowledge base,
    wherein generating the first output data is based on determining the first natural language data and the second natural language data are associated with the second entity in the knowledge base.

3. The computer-implemented method of claim 1, further comprising:
    using a trained machine learning (ML) model, determining first encoded data including the dialog context data and the first natural language data;
    using a second trained classifier, processing the first encoded data to determine that the first natural language data is responsive to the first spoken input;
    using the trained ML model, determining second encoded data including the dialog context data and the second natural language data; and
    using the second trained classifier, processing the second encoded data to determine that the second natural language data is responsive to the first spoken input,
    wherein generating the first output data is based on determining the first natural language data and the second natural language data are responsive to the first spoken input.

4. The computer-implemented method of claim 1, wherein the first sentiment is different from the second sentiment, and the computer-implemented method further comprises:
    generating the first output data to indicate user satisfactions of the first entity based on the first sentiment and the second sentiment.

5. A computer-implemented method comprising:
    receiving first input data corresponding to a first natural language user input;
    determining the first natural language user input is associated with a first entity;
    identifying, in a knowledge base, first natural language data corresponding to first user data with respect to the first entity, wherein the first natural language data is associated with a first sentiment;
    identifying, in the knowledge base, second natural language data corresponding to second user data with respect to the first entity, wherein the second natural language data is associated with a second sentiment; and
    using the first sentiment and the second sentiment, generating first output data responsive to the first natural language user input.

6. The computer-implemented method of claim 5, further comprising:
    performing entity extraction processing on the first input data to determine the first entity;
    determining a second entity that is semantically similar to the first entity;
    determining the first natural language data is associated with the second entity in the knowledge base; and
    determining the second natural language data is associated with the second entity, wherein generating the first output data is based on determining the first natural language data and the second natural language data are associated with the second entity in the knowledge base.

7. The computer-implemented method of claim 5, further comprising:
determining first encoded data including the first input data and the first natural language data;
processing the first encoded data to determine that the first natural language data is responsive to the first natural language user input;
determining second encoded data including the first input data and the second natural language data; and
processing the second encoded data to determine that the second natural language data is responsive to the first natural language user input,
wherein generating the first output data is based on determining the first natural language data and the second natural language data are responsive to the first natural language user input.

8. The computer-implemented method of claim 5, wherein the first sentiment is different from the second sentiment, and the computer-implemented method further comprises:
generating the first output data to indicate user satisfactions of the first entity based on the first sentiment and the second sentiment.

9. The computer-implemented method of claim 5, wherein the first input data is associated with a dialog, and the computer-implemented method further comprises:
determining dialog context data including the first natural language user input and at least a first previous natural language user input of the dialog; and
processing the dialog context data to determine that a response to the first natural language user input requires use of the knowledge base.

10. The computer-implemented method of claim 5, further comprising:
determining third natural language data included in the knowledge base, the third natural language data being associated with the first entity and the second sentiment,
wherein:
the second sentiment is different from the first sentiment,
the first output data includes a first percentage representing that the first natural language data is associated with the first sentiment, and
the first output data includes a second percentage representing that the second natural language data and the third natural language data are associated with the second sentiment.

11. The computer-implemented method of claim 5, wherein the first natural language data is further associated with an entity type representing a subject of the first natural language data.

12. The computer-implemented method of claim 5, further comprising:
receiving video data including an audio data portion;
performing automatic speech recognition (ASR) processing on the audio data portion to generate third natural language data corresponding to speech in the audio data portion;
performing sentiment detection processing on the third natural language data to determine a third sentiment of the speech in the audio data portion; and
further using the third sentiment to generate the first output data.

13. A computing system comprising:
at least one processor; and
at least one memory comprising instructions that, when executed by the at least one processor, cause the computing system to:
receive first input data corresponding to a first natural language user input;
determine the first natural language user input is associated with a first entity;
identify, in a knowledge base, first natural language data corresponding to first user data with respect to the first entity, wherein the first natural language data is associated with a first sentiment;
identify, in the knowledge base, second natural language data corresponding to second user data with respect to the first entity, wherein the second natural language data is associated with a second sentiment; and
use the first sentiment and the second sentiment to generate first output data responsive to the first natural language user input.

14. The computing system of claim 13, wherein the at least one memory further comprises instructions that, when executed by the at least one processor, further cause the computing system to:
perform entity extraction processing on the first input data to determine the first entity;
determine a second entity that is semantically similar to the first entity;
determine the first natural language data is associated with the second entity in the knowledge base; and
determine the second natural language data is associated with the second entity,
wherein generating the first output data is based on determining the first natural language data and the second natural language data are associated with the second entity in the knowledge base.

15. The computing system of claim 13, wherein the at least one memory further comprises instructions that, when executed by the at least one processor, further cause the computing system to:
determine first encoded data including the first input data and the first natural language data;
process the first encoded data to determine that the first natural language data is responsive to the first natural language user input;
determine second encoded data including the first input data and the second natural language data; and
process the second encoded data to determine that the second natural language data is responsive to the first natural language user input,
wherein generating the first output data is based on determining the first natural language data and the second natural language data are responsive to the first natural language user input.

16. The computing system of claim 13, wherein the first sentiment is different from the second sentiment, and the at least one memory further comprises instructions that, when executed by the at least one processor, further cause the computing system to:
generate the first output data to indicate user satisfactions of the first entity based on the first sentiment and the second sentiment.

17. The computing system of claim 13, wherein the first input data is associated with a dialog, and the at least one memory further comprises instructions that, when executed by the at least one processor, further cause the computing system to:
  determine dialog context data including the first natural language user input and at least a first previous natural language user input of the dialog; and
  process the dialog context data to determine that a response to the first natural language user input requires use of the knowledge base.

18. The computing system of claim 13, wherein the at least one memory further comprises instructions that, when executed by the at least one processor, further cause the computing system to:
  determine third natural language data included in the knowledge base, the third natural language data being associated with the first entity and the second sentiment,
  wherein:
    the second sentiment is different from the first sentiment,
    the first output data includes a first percentage representing that the first natural language data is associated with the first sentiment, and
    the first output data includes a second percentage representing that the second natural language data and the third natural language data are associated with the second sentiment.

19. The computing system of claim 13, wherein the first natural language data is further associated with an entity type representing a subject of the first natural language data.

20. The computing system of claim 13, wherein the at least one memory further comprises instructions that, when executed by the at least one processor, further cause the computing system to:
  receive video data including an audio data portion;
  perform automatic speech recognition (ASR) processing on the audio data portion to generate third natural language data corresponding to speech in the audio data portion;
  perform sentiment detection processing on the third natural language data to determine a third sentiment of the speech in the audio data portion; and
  further use the third sentiment to generate the first output data.

* * * * *